(12) United States Patent
Iwaya et al.

(10) Patent No.: US 8,920,043 B2
(45) Date of Patent: Dec. 30, 2014

(54) CONNECTOR UNIT

(75) Inventors: Mitsuhiro Iwaya, Tokyo (JP);
Masayuki Iwase, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 1138 days.

(21) Appl. No.: 12/920,727

(22) PCT Filed: Mar. 2, 2009

(86) PCT No.: PCT/JP2009/053843
§ 371 (c)(1),
(2), (4) Date: Dec. 7, 2010

(87) PCT Pub. No.: WO2009/110421
PCT Pub. Date: Sep. 11, 2009

(65) Prior Publication Data
US 2011/0091158 A1 Apr. 21, 2011

(30) Foreign Application Priority Data

Mar. 3, 2008 (JP) ................................. 2008-051595
Oct. 22, 2008 (JP) ................................. 2008-271762

(51) Int. Cl.
*G02B 6/40* (2006.01)
*G02B 6/38* (2006.01)
*G02B 6/43* (2006.01)
*G02B 6/44* (2006.01)

(52) U.S. Cl.
CPC ............ *G02B 6/3879* (2013.01); *G02B 6/3885* (2013.01); *G02B 6/3897* (2013.01); *G02B 6/43* (2013.01); *G02B 6/3821* (2013.01); *G02B 6/4452* (2013.01); *G02B 6/3893* (2013.01); *G02B 6/3825* (2013.01)
USPC .................. 385/54; 385/53; 385/55; 385/57; 385/59; 385/88; 385/89; 385/136; 385/137; 385/139

(58) Field of Classification Search
CPC .. G02B 6/3897; G02B 6/3885; G02B 6/3893; G02B 6/3825; G02B 6/3821; G02B 6/4452; G02B 6/43
USPC ........................................... 385/53–94
See application file for complete search history.

(56) References Cited

U.S. PATENT DOCUMENTS 5,673,346 A * 9/1997 Iwano et al. .................. 385/60
6,412,986 B1 * 7/2002 Ngo et al. ..................... 385/53

(Continued)

FOREIGN PATENT DOCUMENTS

| CN | 101122658 A | 2/2008 |
| EP | 1 168 020 B1 | 12/2005 |

(Continued)

OTHER PUBLICATIONS

Office Action issued Dec. 21, 2012 in Japanese Patent Application No. 2010-501894 (with English-language translation).

(Continued)

*Primary Examiner* — Ryan Lepisto
*Assistant Examiner* — Guy Anderson
(74) *Attorney, Agent, or Firm* — Oblon, Spivak, McClelland, Maier & Neustadt, L.L.P.

(57) ABSTRACT

The present invention provides a connector unit that can surely position and connect a plurality of optical fiber plugs in a short time and easily release a connected state of optical fiber connectors even if the number of optical fiber connectors increases. A connector unit includes a positioning member for positioning a plurality of optical fiber plugs, an adapter that has plug guide holes for inserting tip ends of the optical fiber plugs to connect with the optical fiber plugs, and guide portions for guiding the positioning member with respect to the adapter and inserting the tip ends of the optical fiber plugs into the plug guide holes of the adapter to connect with the optical fiber plugs.

9 Claims, 22 Drawing Sheets

(56) References Cited

U.S. PATENT DOCUMENTS

| | | | |
|---|---|---|---|
| 6,932,514 B2 * | 8/2005 | Anderson et al. | 385/59 |
| 2003/0092313 A1 | 5/2003 | Schlueter et al. | |
| 2004/0141692 A1 * | 7/2004 | Anderson et al. | 385/53 |
| 2005/0018973 A1 * | 1/2005 | Loder et al. | 385/53 |
| 2005/0135755 A1 * | 6/2005 | Kiani et al. | 385/78 |
| 2005/0163429 A1 * | 7/2005 | Grzegorzewska et al. | 385/55 |
| 2008/0037934 A1 | 2/2008 | Daikuhara et al. | |
| 2008/0037938 A1 * | 2/2008 | Kiani et al. | 385/78 |
| 2009/0274432 A1 | 11/2009 | Iwaya | |
| 2010/0195958 A1 * | 8/2010 | Lu | 385/60 |

FOREIGN PATENT DOCUMENTS

| | | |
|---|---|---|
| JP | 5 119239 | 5/1993 |
| JP | 5 313040 | 11/1993 |
| JP | 10 31131 | 2/1998 |
| JP | 11 38278 | 2/1999 |
| JP | 2000 338362 | 12/2000 |
| JP | 2002 98860 | 4/2002 |
| JP | 2003 185882 | 7/2003 |
| JP | 2005 62513 | 3/2005 |
| JP | 2006 153779 | 6/2006 |
| JP | 2008 40264 | 2/2008 |

OTHER PUBLICATIONS

Extended European Search Report issued on Aug. 25, 2011, in Patent Application No. EP 09 71 7040.1.

Chinese Office Action Issued Aug. 29, 2012 in Patent Application No. 200980107331.2 (with English translation).

* cited by examiner

CONNECTOR UNIT

TECHNICAL FIELD

The present invention relates to a connector unit for an optical fiber and more particularly, to a connector unit that positions and connects plural optical fiber plugs or connects the plural optical fiber plugs to an adapter.

BACKGROUND ART

In the related art, plural optical fiber plugs may be mounted in an adapter of an apparatus, for example. In this case, the optical fiber plugs need to be individually inserted into the adapter and connected. This technology is disclosed in Patent Documents 1 and 2.

In addition, as an example, a tester that transmits a control signal using an optical fiber cable to test an electronic device has an apparatus that generates the control signal and a test head that loads the electronic device and tests the electronic device.

Plural connectors are arranged at the side of the apparatus and plural connectors of plural optical fibers are arranged at the side of the test head. If the plural connectors at the side of the apparatus are connected to the plural connectors at the side of the test head, the apparatus is adapted to transmit the control signal to the test head through the plural optical fibers. This technology is disclosed in Patent Document 3.

Patent Document 1: Japanese Patent Application Laid-Open (JP-A) No. 5-119239
Patent Document 2: JP-A No. 10-31131
Patent Document 3: JP-A No. 2006-153779

DISCLOSURE OF INVENTION

Problem to be Solved by the Invention

However, in connection of the optical fiber plugs that is disclosed in Patent Document 1, work is very troublesome. In particular, if the number of optical fiber plugs increases, a long work time is required.

In the apparatus that is disclosed in Patent Document 3, when the plural connectors at the side of the test head are separated from the plural connectors at the side of the apparatus, the plural connectors at the side of the test head are simultaneously collectively pulled out from the plural connectors at the side of the apparatus. For this reason, pulling resistance of when the plural connectors are collectively pulled out is large. If the number of optical fibers increases, the number of connectors increases. For this reason, the pulling resistance further increases and connector connection cannot be easily released.

Accordingly, the present invention has been made to solve the above problems and it is an object of the present invention to provide a connector unit that can surely position and connect plural optical fiber plugs in a short time, and can easily release a connected state of the optical fiber plugs even if the number of optical fiber plugs increases.

Means for Solving Problem

In order to solve the above problems, a connector unit of the present invention is a connector unit for positioning and connecting a plurality of optical fiber plugs. The connector unit includes a positioning member for positioning the plurality of optical fiber plugs respectively, an adapter that has plug guide holes for inserting tip ends of the plurality of optical fiber plugs respectively to connect with the optical fiber plugs, and a guide portion for guiding the positioning member with respect to the adapter and aligning the tip ends of the plurality of optical fiber plugs in the plug guide holes of the adapter respectively.

In the connector unit of the present invention, the guide portion preferably has a plurality of guide pins that are provided in the positioning member and guide holes that are provided in the adapter to insert the guide pins therein.

In the connector unit of the present invention, the positioning member preferably has plug insertion holes for positioning the plurality of optical fiber plugs at an interval.

In the connector unit of the present invention, preferably, the guide pins start to be inserted into the guide holes, before the tip ends of the optical fiber plugs start to be inserted into the plug guide holes of the adapter.

A connector unit of the present invention is a connector unit for positioning and connecting a plurality of optical fiber plugs. The connector unit includes a positioning member that has a plurality of plug insertion holes for arranging and positioning the plurality of optical fiber plugs, and an adapter that has a plurality of plug guide holes for guiding tip ends of the plurality of optical fiber plugs positioned by the positioning member along an inserted and connected direction of the optical fiber plugs to connect with the optical fiber plugs, and arms which are formed in the plug guide holes and removably engage the optical fiber plugs. A connection releasing portion for dividing the plurality of optical fiber plugs into a plurality of optical fiber groups and changing timing of releasing connection of the optical fiber plugs from the adapter for each of the plurality of optical fiber plug groups is provided in the plurality of plug insertion holes.

In the connector unit of the present invention, each of the optical fiber plugs has a plug frame that holds an optical fiber ferrule and a slider that is disposed slidably with respect to the plug frame, the slider has a latch portion, and grooves are formed in the plug insertion holes, such that the latch portion is slidable along the connection direction and the optical fiber plugs are not pulled out from the plug insertion holes in a direction opposite to a direction where the optical fiber plugs are inserted into the plug insertion holes.

In the connector unit of the present invention, the slider is provided with feather-shaped protrusions to prevent the slider from being pulled out from the side of the connection direction of the positioning member.

In the connector unit of the present invention, the plurality of optical fiber plug groups have a first optical fiber plug group and a second optical fiber plug group, the connection releasing portion has positioning surface portions that are engaged with the feather-shaped protrusions to move the optical fiber plugs in a direction opposite to the inserted and connected direction through the sliders. The positioning surface portions have a first positioning surface portion that determines the engagement position of the first optical fiber plug group and a second positioning surface portion that determines the engagement position of the second optical fiber plug group. The first positioning surface portion and the second positioning surface portion are formed at the predetermined distance in the connection direction.

The connector unit of the present invention further includes a guide fixing portion for removably fixing the positioning member while guiding the positioning member to the adapter.

In the connector unit of the present invention, the guide fixing portion has a first protrusion that is formed in one end of the positioning member, a second protrusion that is formed in the other end of the positioning member, a first receiving portion that is formed in the adapter and fits the first protrusion of the positioning member along the connection direction and positions the first protrusion, and a second receiving portion that is formed in the adapter and fits the second protrusion of the positioning member along the connection direction and positions the second protrusion.

Effect of the Invention

According to the present invention, a connector unit that can surely position and connect plural optical fiber plugs in a short time can be provided. According to the present invention, a connector unit that can easily release a connected state of the optical fiber plugs even if the number of optical fiber plugs increases can be provided.

EXPLANATIONS OF LETTERS OR NUMERALS

Figure 1:
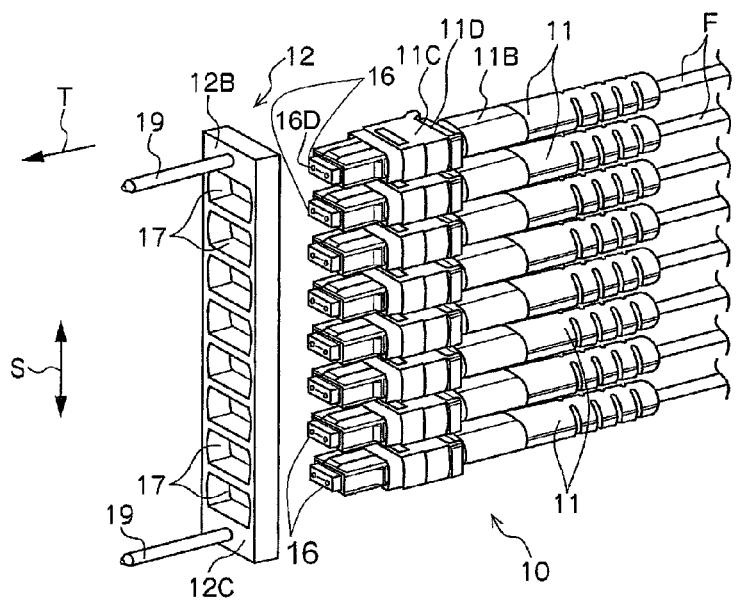
FIG. 1 is a perspective view showing a positioning member and plural optical fiber plugs in a preferred first embodiment of a connector unit of the present invention.

10: connector unit
11: optical fiber plug
12: positioning member
13: adapter
14: guide portion
16: ferrule tip end of optical fiber plug
215: plug frame
17: plug insertion hole
218: feather-shaped protrusion
19: guide pin
20: plug guide hole
21: guide hole
223: groove
224: slider
225: latch portion
226: engagement protrusion
221: plug insertion hole
230: guide fixing portion
231: first protrusion
232: second protrusion
251: first receiving portion
252: second receiving portion
260: plug guide hole
270: arm
280: connection releasing portion
R: connection direction
G1: first optical fiber plug group
G2: second optical fiber plug group

BEST MODE(S) FOR CARRYING OUT THE INVENTION

Hereinafter, preferred embodiments of the present invention will be described in detail with reference to the drawings.

First Embodiment

FIGS. 1 to 7 show a preferred first embodiment of a connector unit of the present invention.

Figure 2:
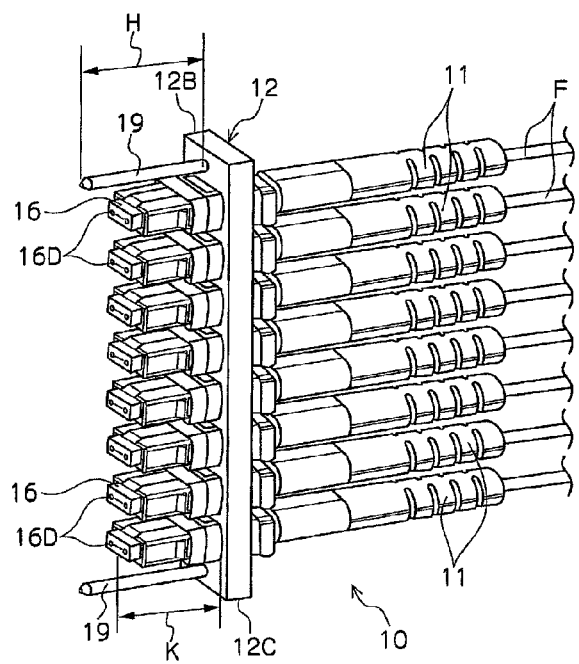
FIG. 2 is a perspective view showing a state where the plural optical fiber plugs are positioned by the positioning member shown in FIG. 1.
Figure 3:
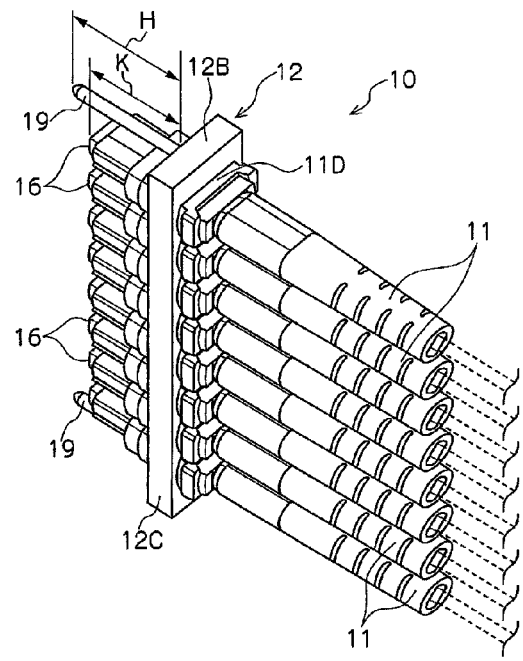
FIG. 3 is a perspective view showing a state where the plural optical fiber plugs are positioned by the positioning member shown in FIG. 1, as viewed from a different angle.

FIG. 1 is a perspective view showing plural optical fiber plugs 11 and a positioning member 12 of a connector unit 10. FIGS. 2 and 3 are perspective views showing a state where the plural optical fiber plugs 11 are positioned respectively by the positioning member 12 at an interval.

Figure 4:
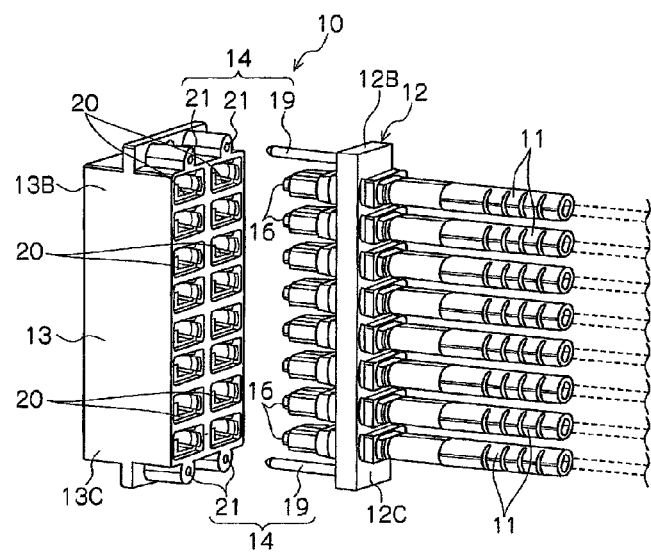
FIG. 4 is a perspective view showing a state where an adapter faces the positioning member.
Figure 5:
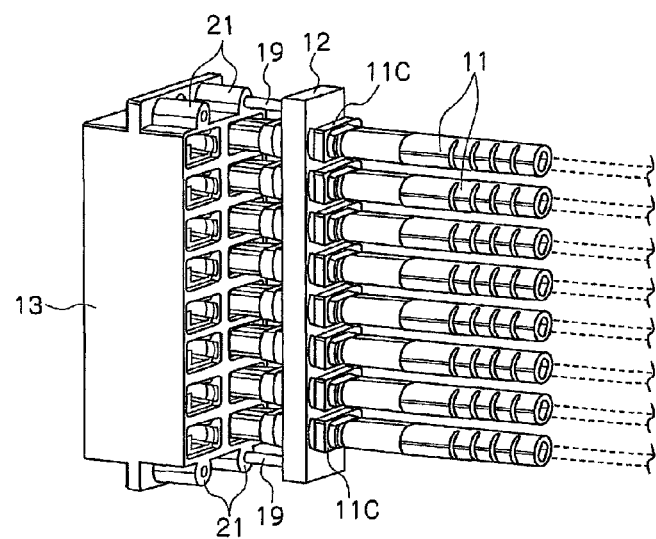
FIG. 5 is a perspective view showing an aspect where the optical fiber plugs start to be inserted into the adapter.

FIG. 4 is a perspective view showing an assembly body of the plural optical fiber plugs 11 and the positioning member 12, and an adapter 13. FIG. 5 is a perspective view showing a state where the individual optical fiber plugs 11 start to be inserted into corresponding guide holes of the adapter 13.

As shown in FIGS. 4 and 5, the connector unit 10 is used to position and connect a total of 16 optical fiber plugs 11. As shown in FIG. 4, the connector unit 10 has a flat positioning member 12, an adapter 13 having a rectangular solid shape, and guide portions 14.

As shown in FIG. 1, each of the optical fiber plugs 11 has a ferrule tip end 16, a boot 11B, and a slider 11C, and holds an optical fiber F. A connection end face of the optical fiber F is exposed to an end face 16D of the ferrule tip end 16.

As shown in FIG. 1, the positioning member 12 that is also called a grid is formed of metal or plastic, and has 8 plug insertion holes 17 to insert and position the sliders 11C of the 8 optical fiber plugs 11 at an interval. The 8 plug insertion holes 17 are formed at an interval along a longitudinal direction S of the positioning member 12.

In each of one end 12B and the other end 12C of the positioning member 12, a guide pin 19 is provided to protrude parallel to a T direction. Each plug insertion hole 17 is a substantially rectangular through-hole that has an external shape bigger than an external shape of the ferrule tip end 16 and has a size enabling the slider 11C to be stuck and fixed. In a direction of a rear portion of the slider 11C, that is, the side of the boot 11B of the optical fiber plug 11, a locking portion 11D that has an external shape bigger than the plug insertion hole 17 is provided.

The adapter 13 shown in FIG. 4 has 16 plug guide holes 20 to insert and connect the ferrule tip ends 16 of the total of 16 optical fiber plugs 11. The 16 plug guide holes 20 are constructed such that the 8 plug guide holes 20 are formed in each of two rows.

In each of one end 13B and the other end 13C of the adapter 13 shown in FIG. 4, two guide holes 21 are formed. In the guide holes 21 of one end 13B, a guide pin 19 of the side of one end 12B of the positioning member 12 can be inserted. In the guide holes 21 of the other end 13C, a guide pin 19 of the side of the other end 12C of the positioning member 12 can be inserted.

As shown in FIG. 4, the guide pins 19 of the positioning member 12 and the guide holes 21 of the adapter 13 constitute the guide portions 14 to guide and position the positioning member 12 to the adapter 13.

The length H by which the guide pin 19 shown in FIG. 3 extrudes from the positioning member 12 is set to be longer than the length K by which the ferrule tip end 16 protrudes from the positioning member 12. For this reason, before the ferrule tip ends 16 of the optical fiber plugs 11 start to be inserted into the plug guide holes 20 of the adapter 13, the guide pins 19 start to be inserted into the corresponding guide holes 21. Thereby, as shown in FIGS. 4 and 5, the positioning member 12 and the plural optical fiber plugs 11 can be surely guided to the adapter 13 and can be inserted.

Next, an assembly sequence of the connector unit will be described with reference to FIGS. 1 to 6.

As shown in FIGS. 1 and 2, in the 8 plug insertion holes 17 of the positioning member 12, the sliders 11C of the optical fiber plugs 11 are inserted at an interval and are positioned. As shown in FIGS. 2 and 3, the length H of the guide pin 19 is longer than the length K of the ferrule tip end 16.

Next, as shown in FIG. 4, the adapter 13 is made to face the positioning member 12. If a worker holds the positioning member 12 and makes the positioning member 12 come close to the adapter 13, as shown in FIGS. 4 and 5, the guide pins 19 start to be inserted into the corresponding guide holes 21, before the ferrule tip ends 16 of the optical fiber plugs 11 start to be inserted into the plug guide holes 20 of the adapter 13. Thereby, as shown in FIGS. 4 and 5, the positioning member 12 and the plural optical fiber plugs 11 can be surely guided the adapter 13 and can be inserted.

Figure 6:
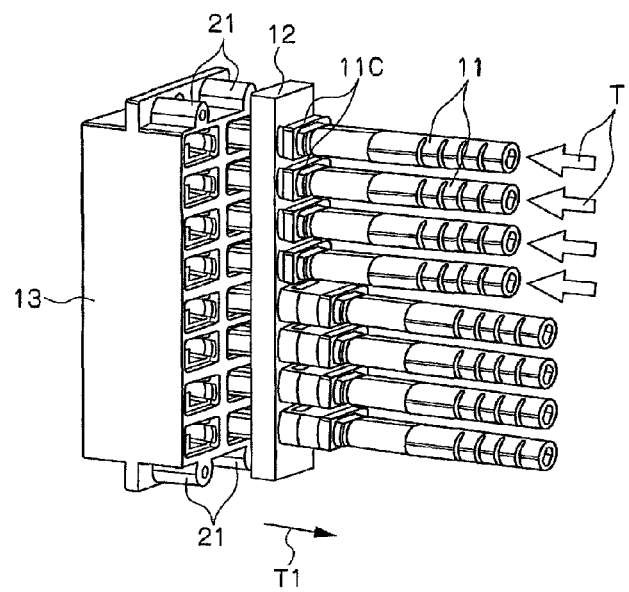
FIG. 6 is a perspective view showing a state where the optical fiber plugs are inserted into the adapter.

As shown in FIG. 6, if the positioning member 12 further comes close to the adapter 13, the tip ends of the optical fiber plugs 11 are inserted into the plug guide holes 20 of the adapter 13. At this time, the optical fiber plugs 11 are in a state immediately before the optical fiber plugs 11 are engaged with the arms formed in the plug guide holes 20 (four optical fiber plugs 11 from the lower side in FIG. 6). If the optical fiber plugs 11 are further pressed in the T direction, the optical fiber plugs 11 are engaged with the arms in the plug guide holes 20 of the adapter 13, and can be optically connected to the connection end in the adapter 13 (four optical fiber plugs 11 from the upper side in FIG. 6).

Figure 7:
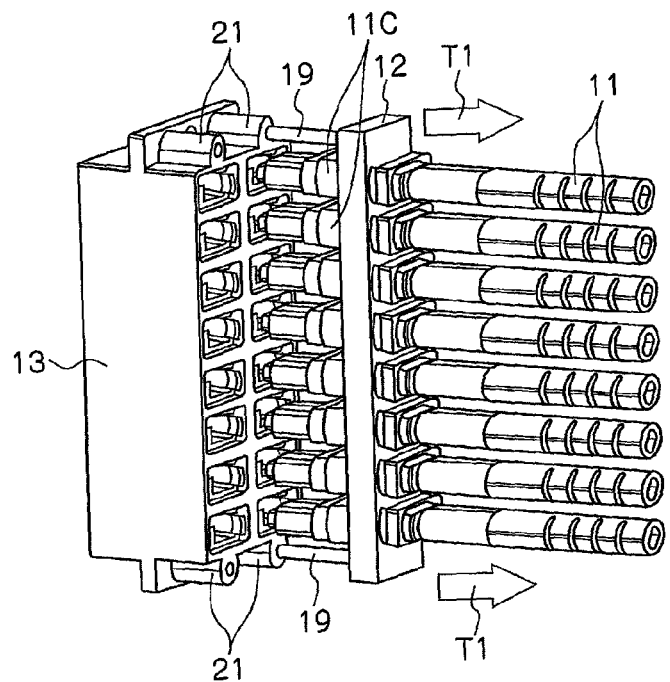
FIG. 7 is a perspective view showing an aspect where the plural optical fiber plugs are removed from the adapter using the positioning member.

As shown in FIG. 7, when the 8 optical fiber plugs 11 are separated from the adapter 13, the positioning member 12 is pulled in the T1 direction, the slider 11C is operated through the locking portion 11D, all of the optical fiber plugs 11 can be separated at one time, and work for separating the positioning member 12 and the 16 optical fiber plugs 11 can be easily performed.

Second Embodiment

FIGS. 8 to 14 show a preferred second embodiment of a connector unit of the present invention.

Figure 8:
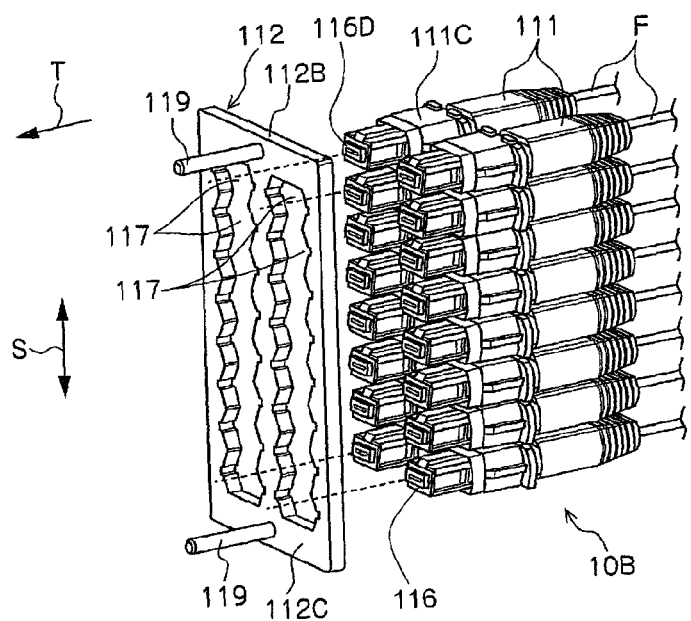
FIG. 8 is a perspective view showing a positing member and plural optical fiber plugs in a preferred second embodiment of a connector unit of the present invention.
Figure 9:
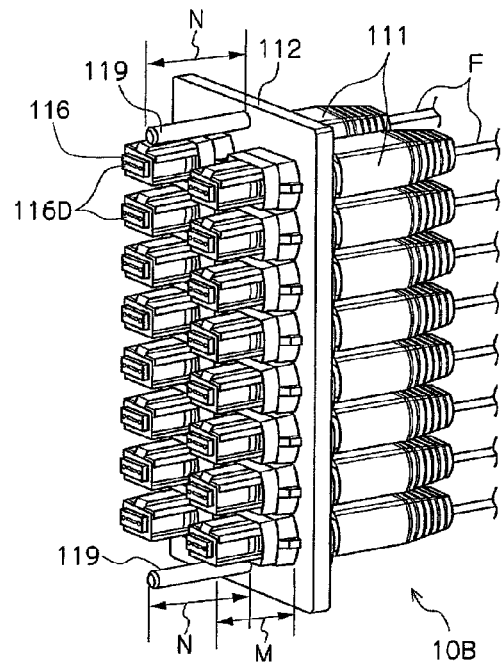
FIG. 9 is a perspective view showing a state where the plural optical fiber plugs are positioned by the positioning member shown in FIG. 8.
Figure 10:
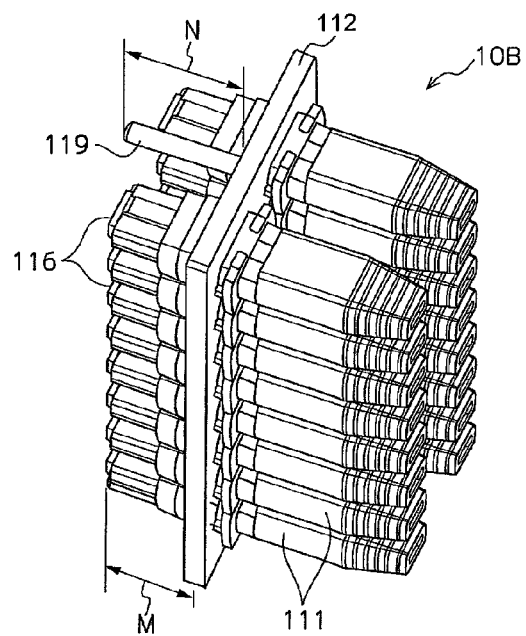
FIG. 10 is a perspective view showing a state where the plural optical fiber plugs are positioned by the positioning member shown in FIG. 8, as viewed from a different angle.

FIG. 8 is a perspective view showing plural optical fiber plugs 111 and a positioning member 112 of a connector unit 10B. FIGS. 9 and 10 are perspective views showing a state where the plural optical fiber plugs 111 are positioned at an interval by the positioning member 112.

Figure 11:
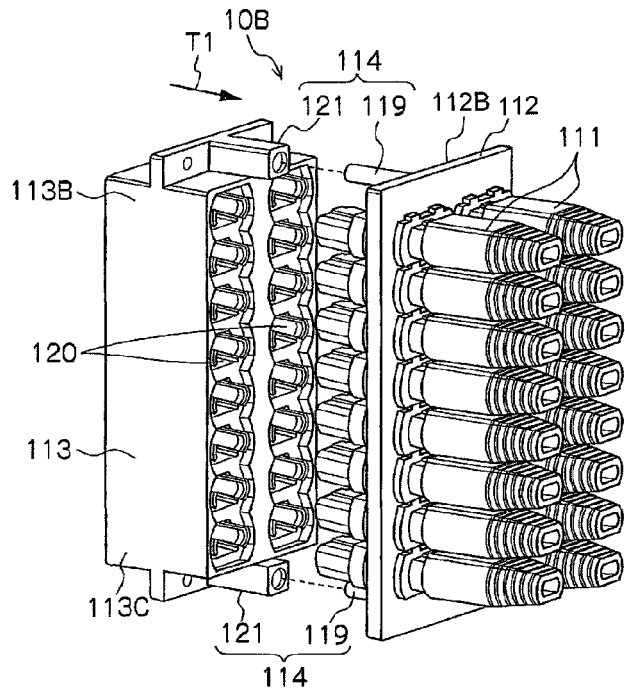
FIG. 11 is a perspective view showing a state where an adapter faces the positioning member.
Figure 12:
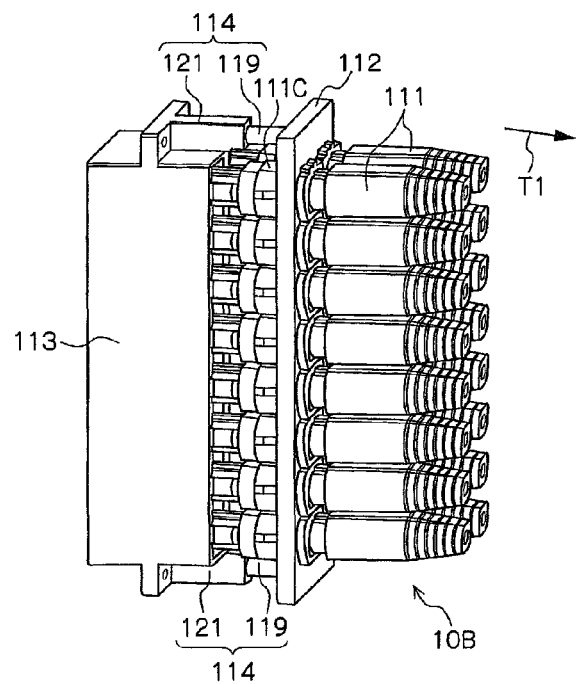
FIG. 12 is a perspective view showing an aspect where the optical fiber plugs start to be inserted into the adapter.

FIG. 11 is a perspective view showing an assembly body of the plural optical fiber plugs 111 and the positioning member 112 and an adapter 113. FIG. 12 is a perspective view showing a state where the optical fiber plugs 111 start to be inserted into corresponding guide holes of the adapter 113.

As shown in FIGS. 11 and 12, the connector unit 10B is used to position and connect a total of 16 optical fiber plugs 111. The connector unit 10B has a flat positioning member 112, an adapter 113 having a rectangular solid shape, and guide portions 114.

As shown in FIG. 8, each of the optical fiber plugs 111 has a ferrule tip end 116, a boot 111B, and a slider 111C, and holds an optical fiber F. A connection end face of the optical fiber F is exposed to an end face 116D of the ferrule tip end 116.

As shown in FIG. 8, the positioning member 112 that is also called a grid is formed of metal or plastic, and has 16 plug insertion holes 117 to insert and position the sliders 111C of the 16 optical fiber plugs 111 at an interval. However, the 16 plug insertion holes 117 are constructed such that the 8 plug insertion holes 117 are continuously formed in a saw-toothed shape along a longitudinal direction S of the positioning member 112, in each of two rows.

As shown in FIG. 8, in each of one end 112B and the other end 112C of the positioning member 112, a guide pin 119 is provided to protrude in a T direction. Each plug insertion hole 117 is a substantially rectangular through-hole that has a shape bigger than a shape of the ferrule tip end 16 and has a size enabling the slider 111C to be stuck and fixed.

The adapter 113 shown in FIG. 11 has 16 plug guide holes 120 to insert and connect the ferrule tip ends 116 of the total of 16 optical fiber plugs 111. The 16 plug guide holes 120 are constructed such that the 8 plug guide holes 120 are formed in each of two rows.

In each of one end 113B and the other end 113C of the adapter 113, one guide hole 121 is formed. In the guide hole 121 of one end 113B, a guide pin 119 of the side of one end 112B of the positioning member 112 can be inserted. In the guide hole 121 of the other end 113C, a guide pin 119 of the side of the other end 112C of the positioning member 112 can be inserted.

The guide pins 119 of the positioning member 112 and the guide holes 121 of the adapter 113 constitute the guide portions 114 to guide and position the positioning member 112 to the adapter 113.

The length N by which the guide pin 119 shown in FIG. 10 extrudes from the positioning member 112 is set to be almost the same as the length M by which the ferrule tip end 116 protrudes from the positioning member 112. However, as shown in FIG. 11, the guide hole 121 of the adapter 113 protrudes in the T1 direction from the surface of the adapter 113. For this reason, before the ferrule tip ends 116 of the optical fiber plugs 111 start to be inserted into the plug guide holes 120 of the adapter 113, the guide pins 119 start to be inserted into the corresponding guide holes 121. Thereby, as shown in FIGS. 11 and 12, the positioning member 112 and the plural optical fiber plugs 111 can be surely guided to the adapter 113 and can be inserted.

Next, an assembly sequence of the connector unit will be described with reference to FIGS. 8 to 14.

As shown in FIGS. 8 and 9, in the 16 plug insertion holes 117 of the positioning member 112, the sliders 111C of the optical fiber plugs 111 are inserted at an interval and are positioned.

Next, as shown in FIG. 11, the adapter 113 is made to face the positioning member 112. If the worker holds the positioning member 112 and makes the positioning member 112 come close to the adapter 113, as shown in FIGS. 11 and 12, the guide pins 119 start to be inserted into the corresponding guide holes 121, before the ferrule tip ends 116 of the optical fiber plugs 111 start to be inserted into the plug guide holes 120 of the adapter 113. Thereby, as shown in FIGS. 11 and 12, the positioning member 112 and the plural optical fiber plugs 111 can be surely guided to the adapter 113 and can be inserted.

Figure 13:
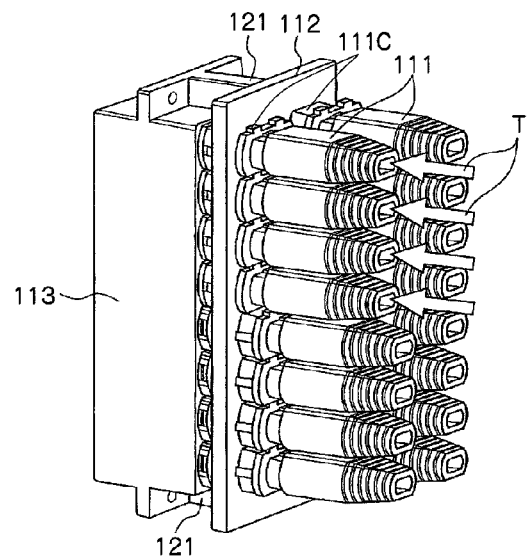
FIG. 13 is a perspective view showing a state where the optical fiber plugs are inserted into the adapter.

As shown in FIG. 13, if the positioning member 112 further comes close to the adapter 113, the tip ends of the optical fiber plugs 111 are inserted into the plug guide holes 120 of the adapter 113. At this time, the optical fiber plugs 111 are in a state immediately before the optical fiber plugs 111 are engaged with the arms formed in the plug guide holes 120. If the optical fiber plugs 111 are further pressed in the T direction, the optical fiber plugs 111 are engaged with the arms in the plug guide holes 120 of the adapter 113, and can be optically connected to the connection end in the adapter 113 (four optical fiber plugs 111 from the upper side in the row of the front side in FIG. 13).

Figure 14:
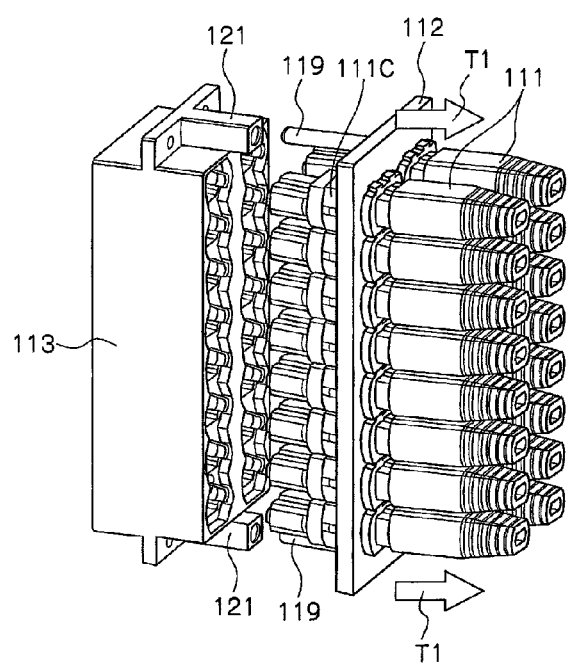
FIG. 14 is a perspective view showing an aspect where the plural optical fiber plugs are removed from the adapter using the positioning member.

As shown in FIG. 14, when the 16 optical fiber plugs 111 are separated from the adapter 113, one positioning member 112 is pulled in the T1 direction, all of the optical fiber plugs 111 can be separated at one time, and work for separating the positioning member 112 and 16 optical fiber plugs 111 can be easily performed.

The connector unit of the present invention positions and connects the plural optical fiber plugs. The connector unit includes the positioning member that positions the plural optical fiber plugs, the adapter that has the plug guide holes to insert and connect the tip ends of the plural optical fiber plugs, and the guide portions that guide the positioning member to the adapter and insert the tip ends of the plural optical fibers into the plug guide holes of the adapter and connects the tip ends. Thereby, the plural optical fiber plugs can be surely positioned and connected in a short time.

The guide portion has the plural guide pins that are provided in the positioning member and the guide holes that are provided in the adapter and insert the guide pins therein. Thereby, the positioning member and the adapter can be accurately mutually positioned by only inserting the guide pins into the guide holes. After the mutual positioning ends, the tip ends of the plural optical fiber plugs are inserted into the plug guide holes of the adapter and can be surely connected.

The positioning member has the plug insertion holes to position the plural optical fiber plugs at an interval. Thereby, the positioning member can mutually position the optical fiber plugs at the accurate positions.

Before the tip ends of the optical fiber plugs start to be inserted into the plug guide holes of the adapter, the guide pins start to be inserted into the guide holes. Thereby, even though the number of optical fiber plugs is large, the positioning member and the plural optical fiber plugs can be surely guided to the adapter and can be inserted.

The other aspects of the connector unit of the present invention will be described.

Figure 15:
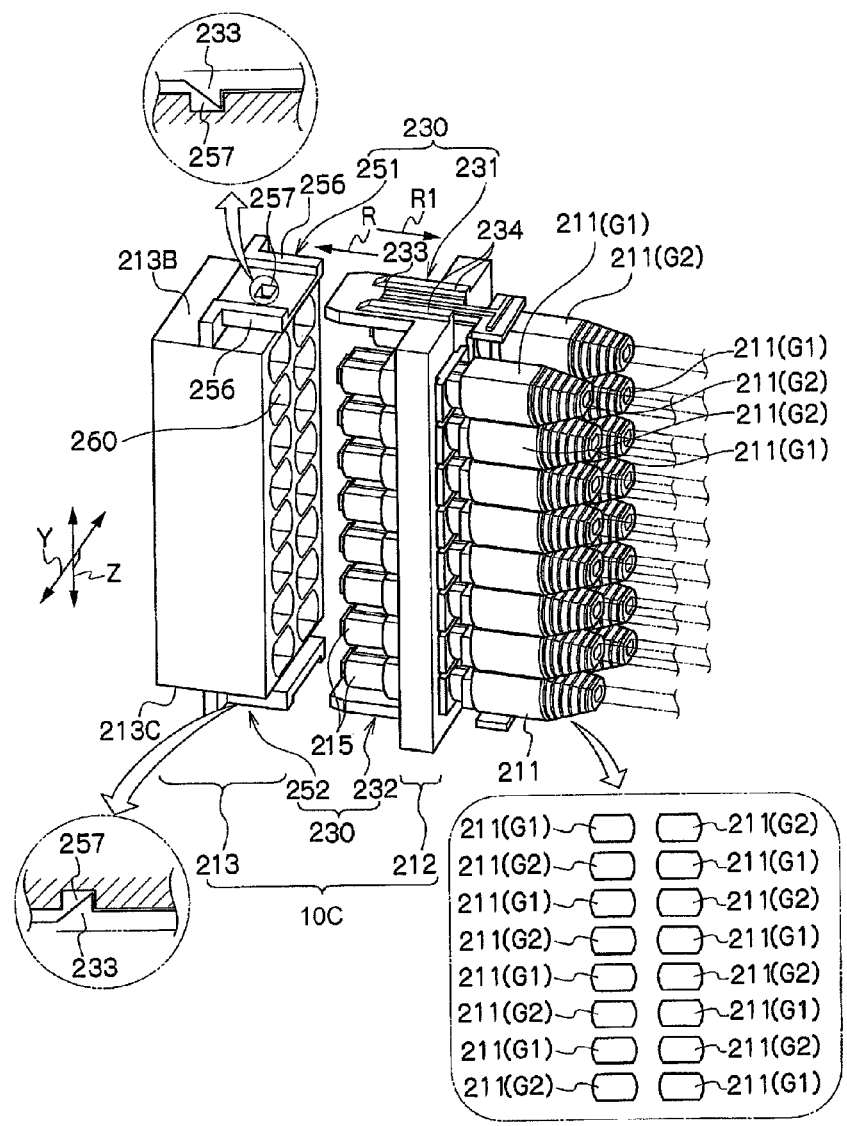
FIG. 15 is a perspective view showing a preferred embodiment of a connector unit of the present invention.

FIG. 15 is a perspective view showing a preferred embodiment of a connector unit of the present invention.

A connector unit 10C shown in FIG. 15 is used to position and connect a total of 16 optical fiber plugs 211. The connector unit 10C includes a flat positioning member 212 and an adapter 213 having a rectangular solid block shape.

In FIG. 15, the positioning member 212 positions the 16 optical fiber plugs 211 at a constant interval in two rows. FIG. 15 shows a state before the positioning member 212 is removably fixed to the adapter 213.

Figure 16:
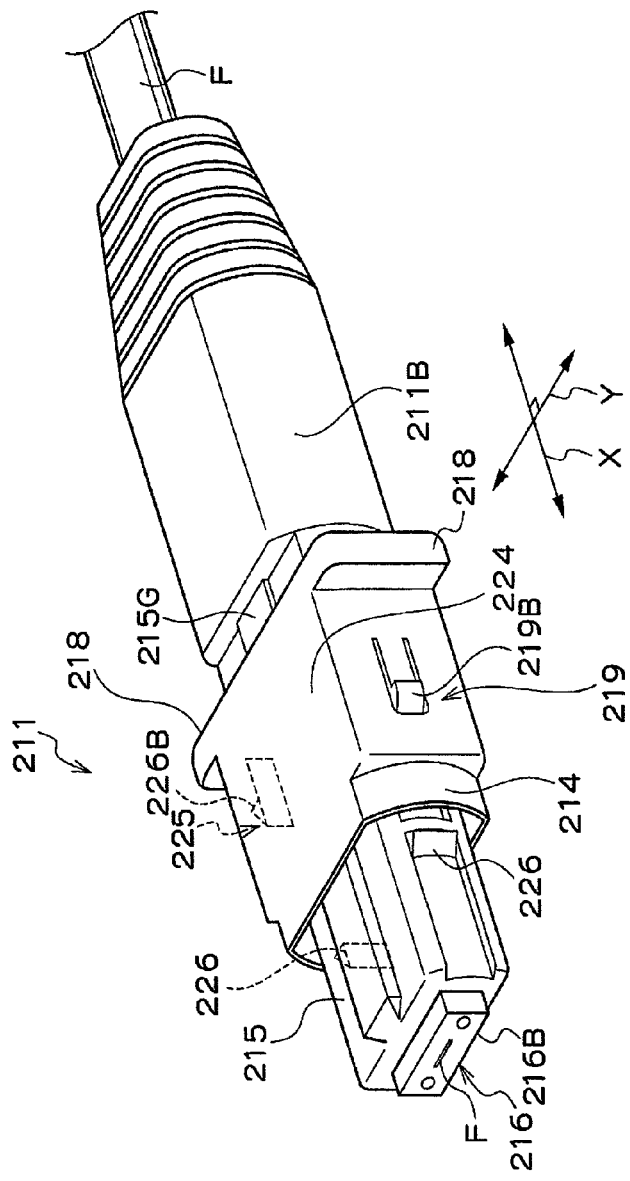
FIG. 16 is a perspective view showing an example of a structure of optical fiber plugs shown in FIG. 15.

FIG. 16 shows an example of a structure of the optical fiber plugs 211 shown in FIG. 15. The optical fiber plug 11 shown in FIG. 16 has the configuration that is similar to an F13-type multi-core optical fiber connector described in JIS C 5982, which is generally called an MPO connector, and has a boot 211B, a plug frame 215, a ferrule 216, a slider 224, and a spring (not shown in the drawings) that is stored in the plug frame 215 and biases the ferrule 216 forward. The ferrule 216 is held in the plug frame 215 and a tip end face 216B of the ferrule 216 is exposed from a tip end of the plug frame 215. The ferrule 216 holds plural optical fibers F, and a connection end face of the optical fiber F is exposed to the tip end face 216B of the ferrule 216. The plural optical fibers F pass through the boot 211B and the ferrule 216.

The slider 224 shown in FIG. 16 is slidable in a predetermined range in an X direction along a guide portion 215G of the plug frame 215, with respect to the plug frame 215. The slider 224 has two feather-shaped protrusions 218 and two latch portions 219. The two feather-shaped protrusions 218 are formed to protrude in an opposite direction along a Y direction orthogonal to an X direction. The two latch portions 219 are elastically deformable in the Y direction, and tip ends 219B of the latch portions 219 protrude along the Y direction.

The plug frame 215 shown in FIG. 16 has two engagement protrusions 226. The engagement protrusions 226 are formed to protrude along the Y direction.

Figure 17:
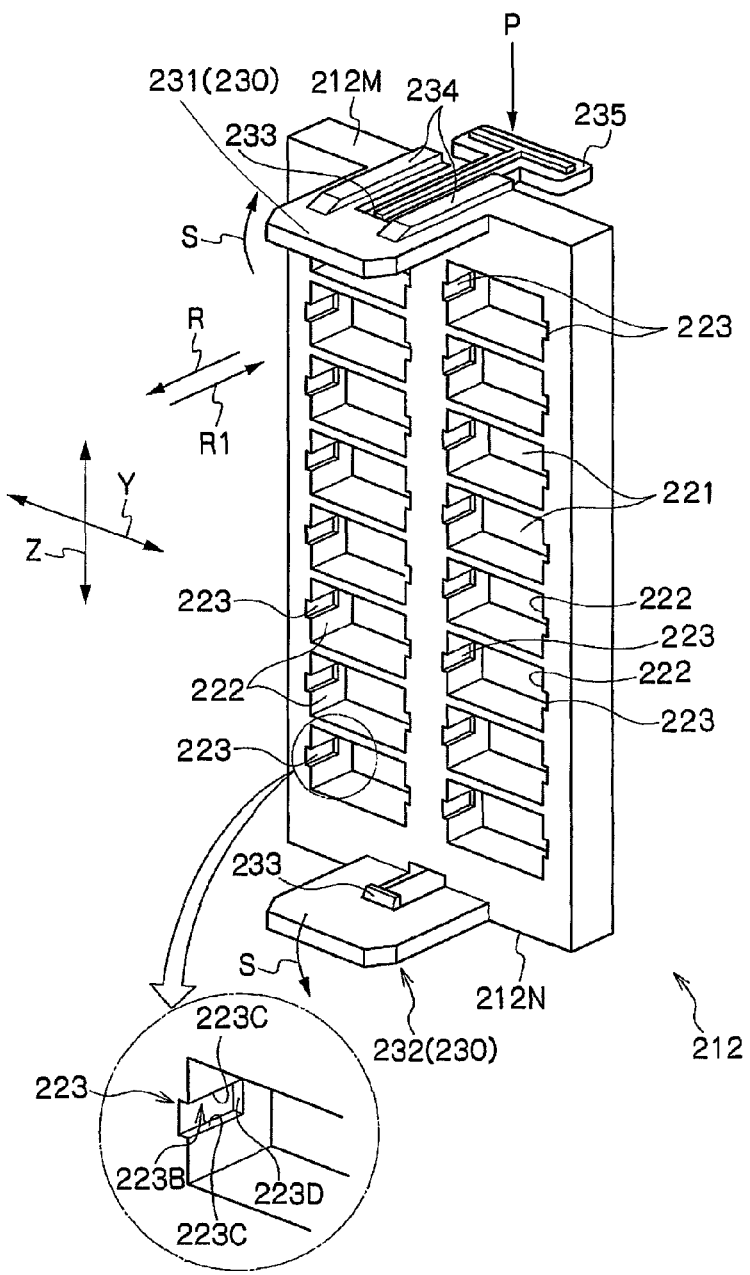
FIG. 17 is a perspective view of a positioning member when viewed from one direction.
Figure 18:
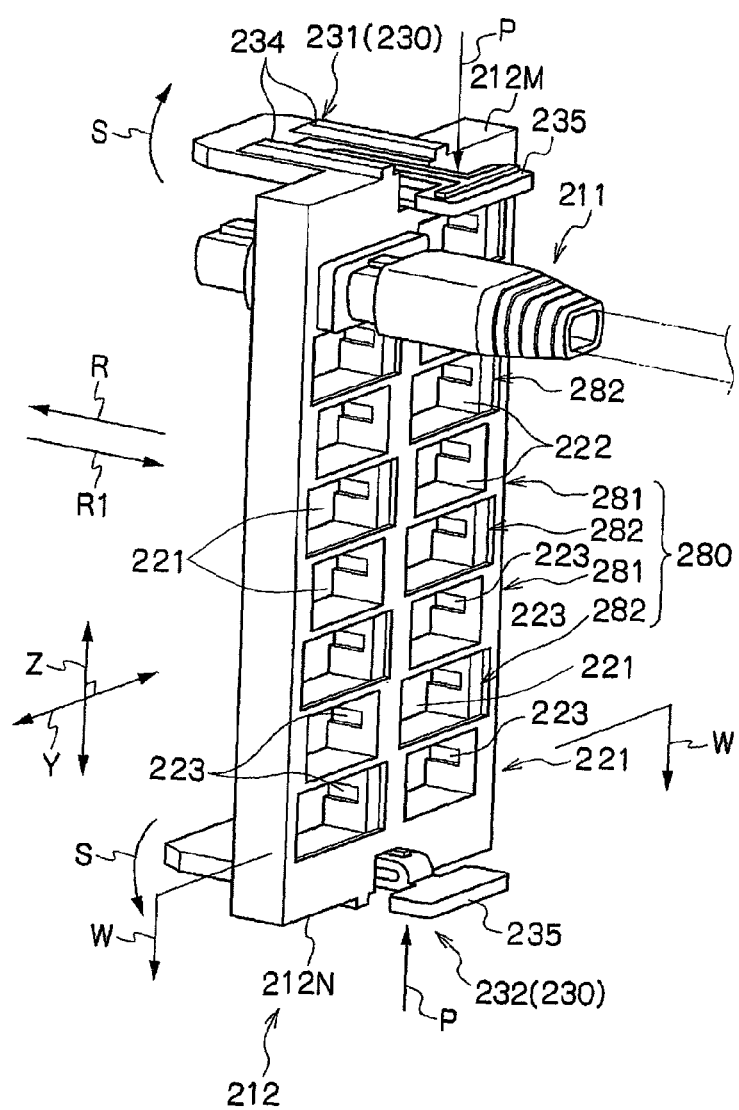
FIG. 18 is a perspective view of the positioning member when viewed from another direction.

Next, an example of a structure of the flat positioning member 212 will be described with reference to FIGS. 15 and 17 to 20. FIG. 17 is a perspective view of the positioning member 212 when viewed from one direction and FIG. 18 is a perspective view of the positioning member 212 when viewed from another direction. FIG. 17 shows only the positioning member 212. However, FIG. 18 shows a state where one optical fiber plug 211 is inserted into one plug insertion hole 221 and is positioned.

Figure 19:
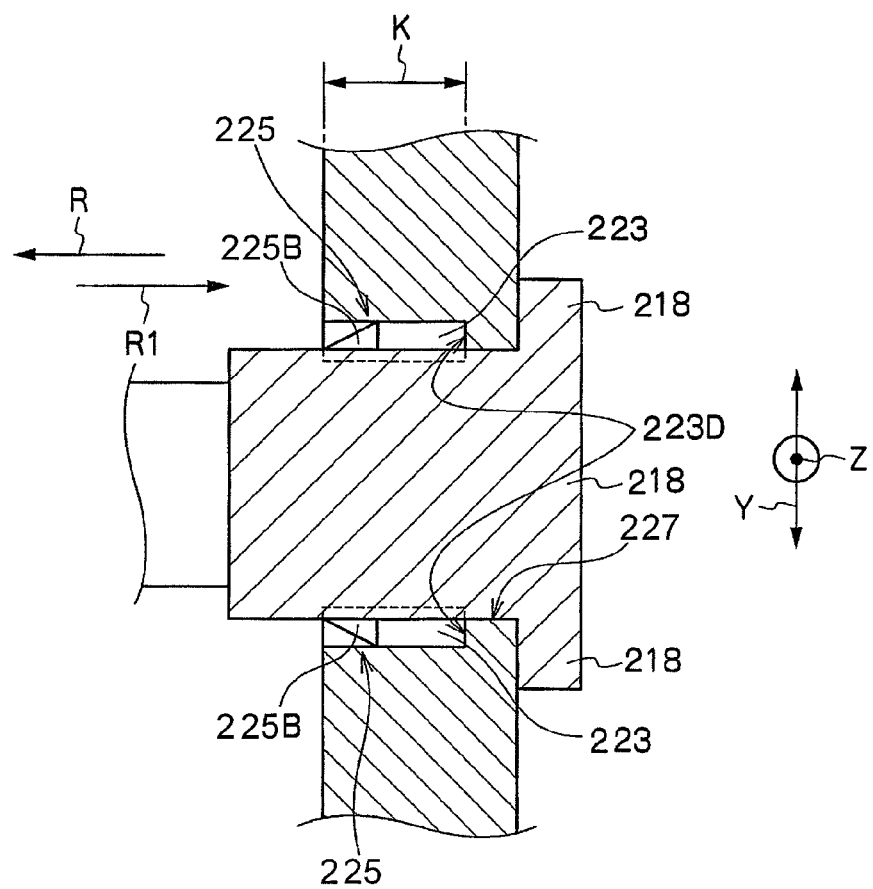
FIG. 19 is a cross-sectional view showing peripheral portions of latch portions of a slider and grooves of a positioning member.
Figure 20:
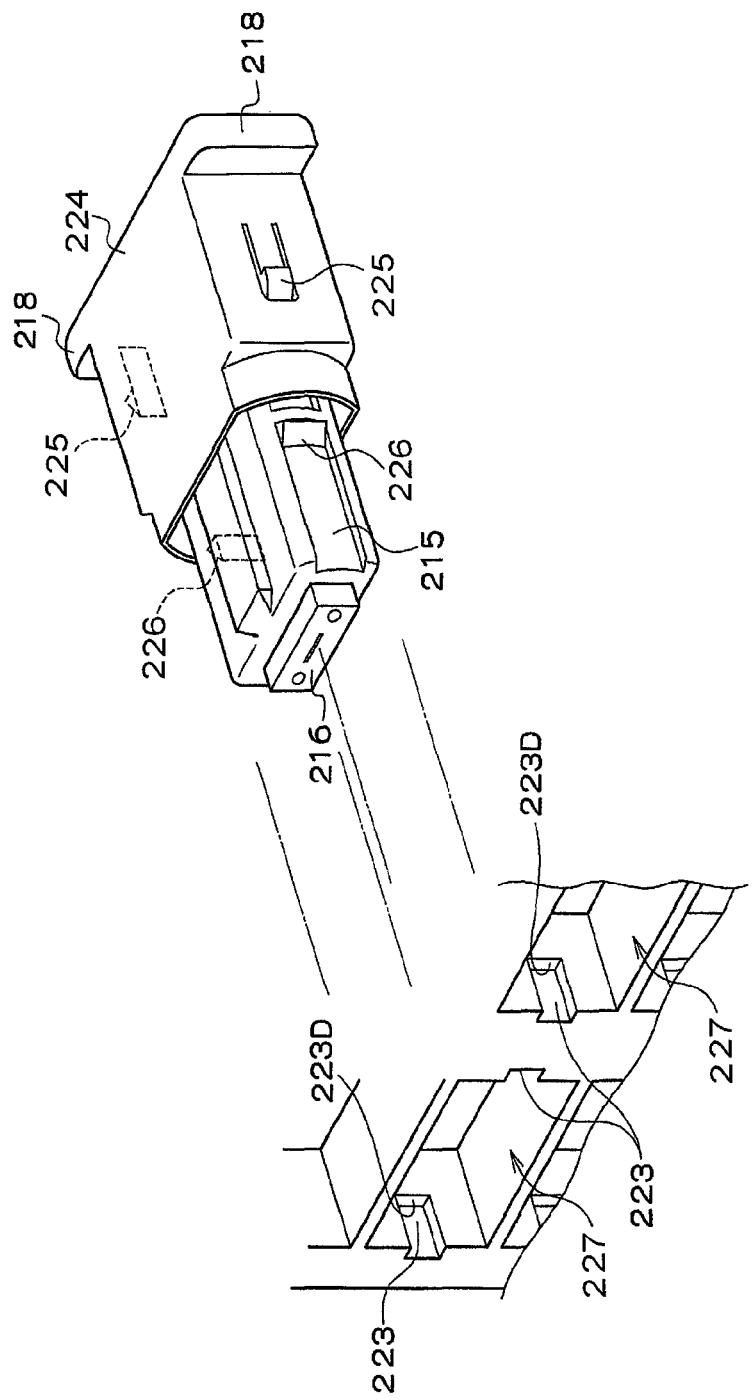
FIG. 20 is a perspective view showing peripheral portions of latch portions of a slider and grooves of a positioning member.

FIG. 19 is a cross-sectional view showing peripheral portions of the latch portions 219 of the slider 224 and the grooves 223 of the positioning member 212. FIG. 20 is a perspective view showing peripheral portions of the latch portions 219 of the slider 224 and the grooves 223 of the positioning member 212.

The positioning member 212 shown in FIGS. 17 and 18 is formed of metal or plastic, and is a member that inserts the total of 16 optical fiber plugs 211 at a predetermined arrangement pitch and positions the optical fiber plugs. For this reason, the positioning member 212 has the 16 plug insertion holes 221. Each of the plug insertion holes 221 has a substantially rectangular shape. The 16 plug insertion holes 221 are divided into two rows of equally pitched 8 plug insertion holes. The plug insertion holes within a row are arranged along Z direction, and two rows are arranged along Y direction.

FIG. 18 exemplifies a state where one optical fiber plug 211 is inserted into one plug insertion hole 221 and is positioned. However, FIG. 15 shows a state where the 16 optical fiber plugs 211 are inserted into the plug insertion holes 221 and are positioned.

As shown in FIGS. 17 and 18, a pair of grooves 223 are formed in facing inner surfaces 222 of each plug insertion hole 221. As shown in FIGS. 19 and 20, the latch portions 219 of the slider 224 of the optical fiber plug 221 shown in FIG. 16 can be inserted into the grooves 223 and can be locked. The depth K of the grooves 223 is set such that the slider 224 has the appropriate slide amount along a connection direction R.

As shown in FIG. 17, each groove 223 is formed by an inner bottom surface 223B, two sides 223C, and a rear end 223D. Because the latch portion 219 bumps into the rear end 223D, the optical fiber plug 211 is not pulled out from the plug insertion hole 221, in a direction R1 opposite to the connection direction R.

As shown in FIGS. 17 and 18, a first protrusion 231 of a guide fixing portion 230 is formed in one end 212M of the positioning member 212, and a second protrusion 232 of the guide fixing portion 230 is formed in the other end 212N of the positioning member 212. The first protrusion 231 and the second protrusion 232 are formed in shapes symmetrical to each other in a vertical direction, and protrude in parallel along the connection direction R.

The first protrusion 231 and the second protrusion 232 are fitted into a first receiving portion 251 and a second receiving portion 252 of the slider 213 shown in FIG. 15 along the connection direction R and are removably fixed, which will be described below.

As shown in FIGS. 17 and 18, the flat first protrusion 231 has a latch portion 233, a guide portion 234, and an operation arm 235. The latch portion 233 is formed to protrude at the side of an inner surface of the first protrusion 231. The two guide portions 234 are formed to protrude at the side of an external surface of the first protrusion 231 and be parallel along the connection direction R. The operation arm 235 can lift the latch portion 233 in an S direction, if the worker presses the operation arm 235 in a P direction using a finger.

Likewise, as shown in FIGS. 17 and 18, the flat second protrusion 232 has a latch portion 233, a guide portion 234, and an operation arm 235. The latch portion 233 is formed to protrude at the side of an inner surface of the second protrusion 232. The two guide portions 234 are formed to protrude at the side of an external surface of the second protrusion 232 and be parallel along the connection direction R. The operation arm 235 can lift the latch portion 233 in an S direction, if the worker presses the operation arm 235 in a P direction using the finger.

Next, an example of the structure of the adapter 213 will be described with reference to FIGS. 15, 21, and 22.

Figure 21:
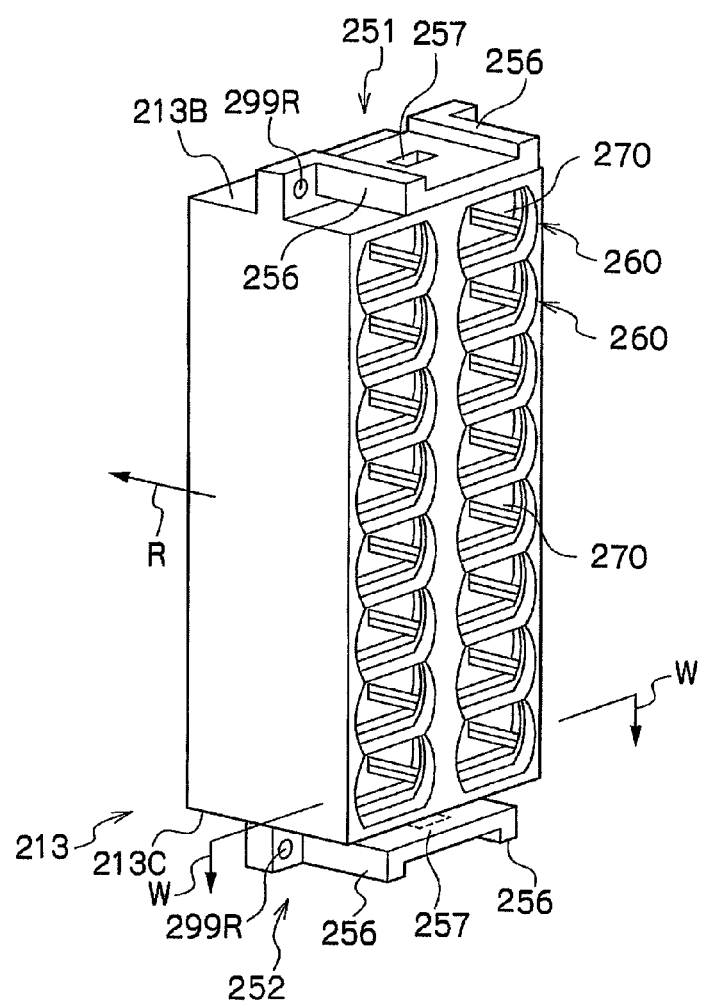
FIG. 21 is a perspective view showing an adapter having a rectangular solid block shape.

FIG. 21 is a perspective view showing the adapter 213. FIG. 22 is a cross-sectional view showing a state where the positioning member 212, the adapter 213, and the optical fiber plug 211 are connected to each other.

Figure 22:
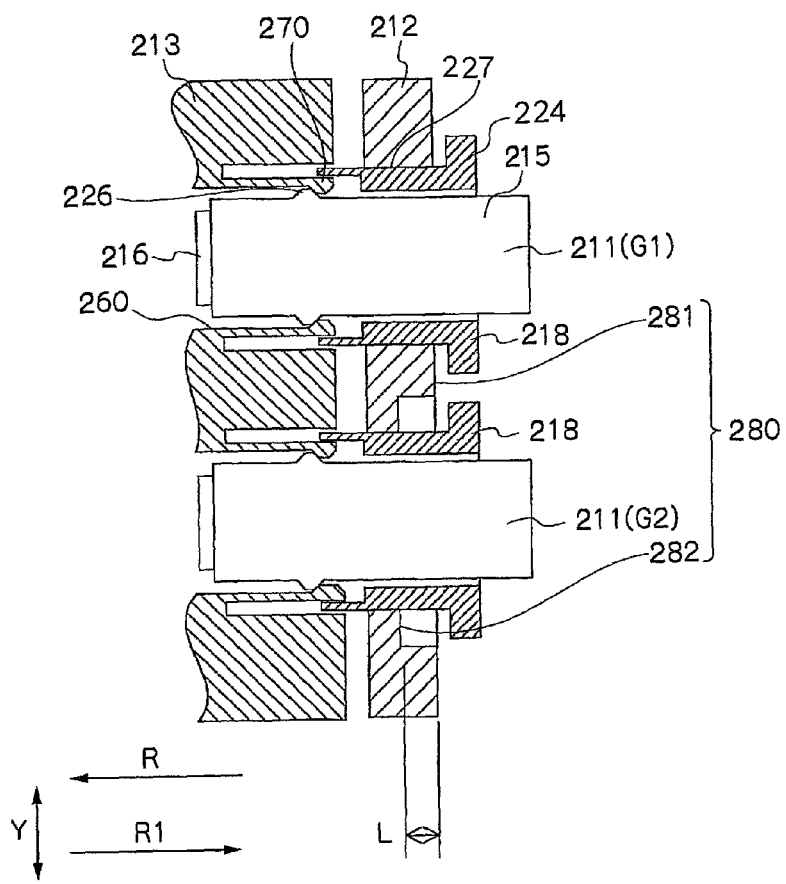
FIG. 22 is a cross-sectional view showing a state where the optical fiber plugs, the positioning member, and the adapter having a rectangular solid block shape are connected.

The adapter 213 shown in FIGS. 21 and 22 are formed of metal or plastic, and has plural plug guide holes 260 and a pair of arms 270 that are formed in each of the plural plug guide holes 260. As shown in FIG. 22, in a connected state, the arms 270 of the adapter 213 and the two engagement protrusions 226 of the plug frame 215 of the optical fiber plug 211 are engaged with each other, and the tip end of the slider 224 is put on from the outside of the arm 270.

As shown in FIG. 21, the first receiving portion 251 of the guide fixing portion 30 is formed in one end 213B of the adapter 213, and the second receiving portion 252 of the guide fixing portion 230 is formed in one end 213C of the adapter 213. As shown in FIG. 15, the first receiving portion 251 is a portion that fits the first protrusion 231 of the guide fixing portion 230 along the connection direction R and removably fixes the first protrusion portion 231, and the second receiving portion 252 is a portion that fits the second protrusion 232 of the guide fixing portion 230 along the connection direction R and removably fixes the second protrusion portion 232.

The first receiving portion 251 and the second receiving portion 252 shown in FIGS. 15 and 21 are formed in shapes symmetrical to each other in a vertical direction, and have two guide portions 256 and a latch hole 257. As shown in FIG. 15, the first protrusion 231 is guided to the first receiving portion 251 along the connection direction R, such that the first protrusion 231 is guided between the two guide portions 256, and the second protrusion 232 is guided to the second receiving portion 252 along the connection direction R, such that the second protrusion 232 is guided between the two guide portions 256 of the second receiving portion 252.

As shown in FIG. 21, the adapter 213 has four screw holes 299R and the adapter 213 can be fixed to the apparatus using screws (not shown in the drawings). The adapter 213 may be fixed to the apparatus using springy metal fittings, instead of the screws.

As shown in FIG. 15, the latch portion 233 of the first protrusion 231 is stuck into the latch hole 257 of the first receiving portion 251 and the latch portion 233 of the second protrusion 232 is stuck into the latch hole 257 of the second receiving portion 252.

Thereby, the positioning member 212 can be guided to the adapter 213 and connected using the vertically disposed guide fixing portions 230, and can be removably fixed.

Figure 23:
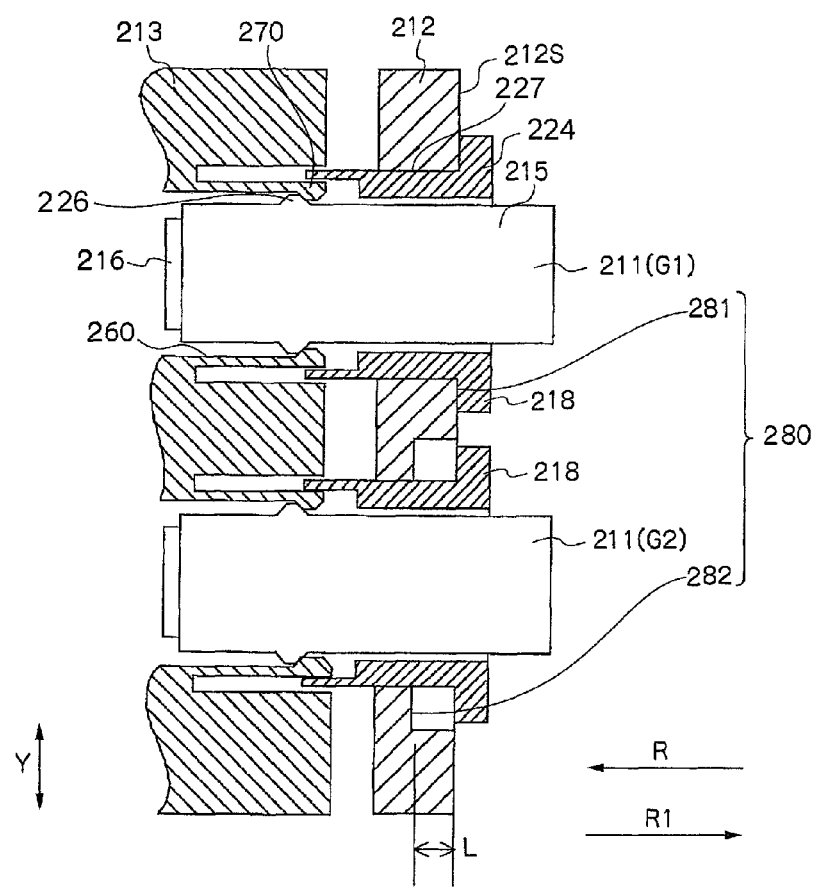
FIG. 23 is a cross-sectional view showing an aspect where connection of the positioning member, the adapter, and optical fiber plugs of a first optical fiber plug group G1 and optical fiber plugs of a second optical fiber plug group G2 adjacent in a Y direction is released.

Next, a structure of a connection releasing portion 280 that is formed in the positioning member 212 will be described with reference to FIGS. 15, 18, and 23. FIG. 23 shows the optical fiber plugs 211 of the optical fiber plug group G1 and the optical fiber plugs 211 of the optical fiber plug group G2 adjacent in a horizontal direction and the connection releasing portion 280.

The connection releasing portion 280 is provided in the plural plug insertion holes 221 of the positioning member 212. As exemplified in FIG. 15, the connection releasing portion 280 divides the plural optical fiber plugs 211 into the plural optical fiber groups G1 and G2 and changes timing of releasing connection of the engagement protrusion 226 of the optical fiber plug 211 shown in FIGS. 23 and 22 from the arm 270 of the adapter 213, for each of the plural optical fiber plug groups G1 and G2. FIGS. 23 and 22 show states of sections taken along the line W-W in FIGS. 18 and 21.

As shown in FIG. 15, the first optical fiber plug group G1 includes the 8 optical fiber plugs 211 and the other optical fiber plug group G2 includes the remaining 8 optical fiber plugs 211.

As shown in FIG. 15, the optical fiber plugs 211 of the first optical fiber plug group G1 and the optical fiber plugs 211 of the second optical fiber plug group G2 adjacent in the horizontal diction are arranged along the Y direction with respect to the plural plug insertion holes 221 of the positioning member 212 and are inserted. The optical fiber plugs 211 of the first optical fiber plug group G1 and the optical fiber plugs 211 of the second optical fiber plug group G2 adjacent in the vertical diction are arranged along the Z direction with respect to the plural plug insertion holes 221 of the positioning member 212 and are inserted.

As shown in FIGS. 18 and 23, the connection releasing portion 280 has 8 first positioning surface portions 281 and 8 second positioning surface portions 282.

FIG. 22 shows an inserted and connected state of the positioning member 212, the adapter 213, and the optical fiber plugs 211 of the first optical fiber plug group G1 and the optical fiber plugs 211 of the second optical fiber plug group G2 adjacent in the Y direction, which are shown in FIG. 15.

In all of the optical fiber plugs 211 of the optical fiber plug groups G1 and G2, the two engagement protrusions 226 of the plug frame 215 are engaged with the arm 270, and the tip end of the slider 224 is put on from the outside of the arm 270.

As shown in FIG. 23, the first positioning surface portion 281 is a portion that defines positioning when each optical fiber plug 211 of the first optical fiber plug group G1 is retreated in the connection releasing direction R1 and connection is released. Likewise, the second positioning surface portion 282 is a portion that defines positioning when each optical fiber plug 211 of the second optical fiber plug group G2 is retreated in the connection releasing direction R1 and connection is released.

As shown in FIG. 23, the first positioning surface portion 281 is a flat end face 212S of the positioning member 212, and the second positioning surface portion 282 is a recess of the positioning member 212. The recess is recessed by the distance L from the flat end face 212S. That is, as shown in FIG. 23, the formation position P2 of the second positioning surface portion 282 is the position retreated by the distance L in the connection releasing direction R1, with respect to the formation position P1 of the first positioning surface portion 281.

FIG. 23 is a cross-sectional view showing a function of the connection releasing portion 280 when the positioning member 212 is operated to release connection of the optical fiber plug 211. If the positioning member 212 is retreated in the R1 direction, the first positioning surface portion 281 bumps into the two feather-shaped protrusions 218 of the optical fiber plug 211 of the first optical fiber plug group G1. However, the second positioning surface portion 282 does not bump into the feather-shaped protrusions 218 of the optical fiber plug 211 of the second optical fiber plug group G2 and a gap that corresponds to the distance L is maintained. That is, if the positioning member 212 is further moved in the R1 direction from the state of FIG. 23, the optical fiber plug 211 of the first optical fiber plug group G1 is pulled in the R1 direction and connection is released. Meanwhile, a connection releasing action is not applied to the optical fiber plug 211 of the second optical fiber plug group G2. Thereby, connection of the first optical fiber plug group G1 and the second optical fiber plug group G2 can be sequentially released, not simultaneously.

Next, an example of work for inserting and connecting the 16 optical fiber plugs 211 or separating the 16 optical fiber plugs with respect to the connector unit 10C according to the embodiment of the present invention will be described.

First, the optical fiber plugs 211 are inserted into the plug insertion holes 221 of the positioning member 212 shown in FIG. 18 and are aligned at the same pitch. That is, the slider 224 of each optical fiber plug 211 shown in FIG. 16 is inserted into the plug insertion hole 221 shown in FIG. 18. As such, when the sliders 224 are inserted into the plug insertion holes 221, as shown in FIGS. 19 and 20, the pair of latch portions 219 of the slider 224 are fitted into the grooves 223 of the positioning member 212 and are slidable along the connection direction R.

In this way, as shown in FIG. 15, if the 16 optical fiber plugs 211 are inserted into the plug insertion holes 221 of the positioning member 212, the plug frames 215 of the optical fiber plugs 211 protrude from the positioning member 212.

Next, as shown in FIG. 15, the adapter 213 and the positioning member 212 are made to face each other, and each plug guide hole 260 of the adapter 213 and each plug insertion hole 221 of the positioning member 212 are made to face each other.

Figure 24:
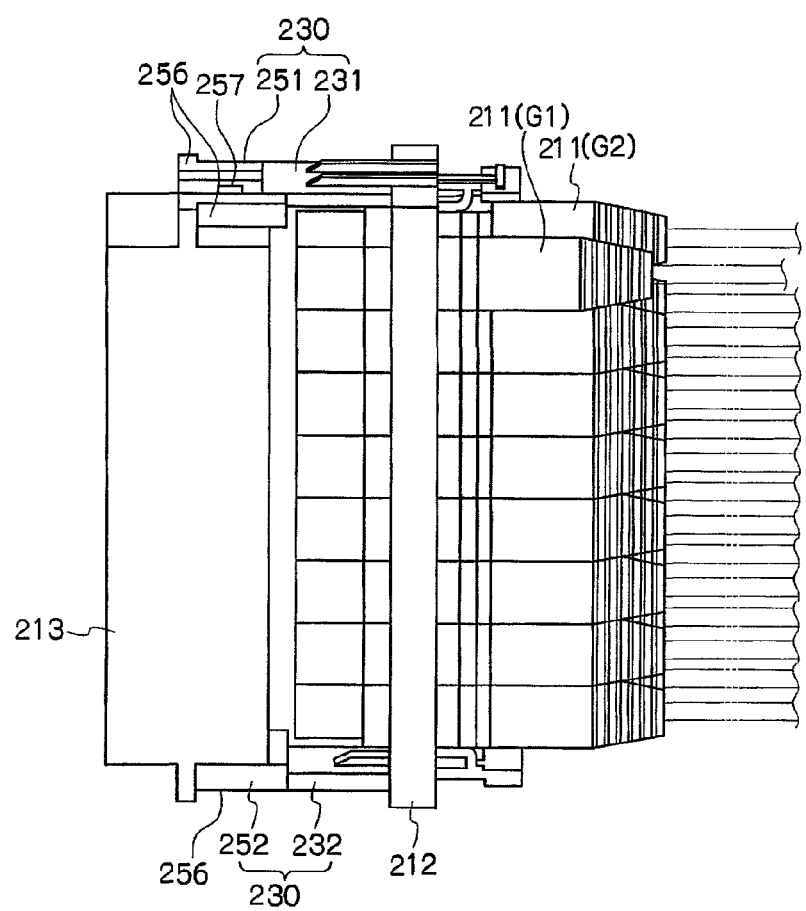
FIG. 24 is a perspective view showing a state immediately before the positioning member and the adapter are connected.
Figure 25:
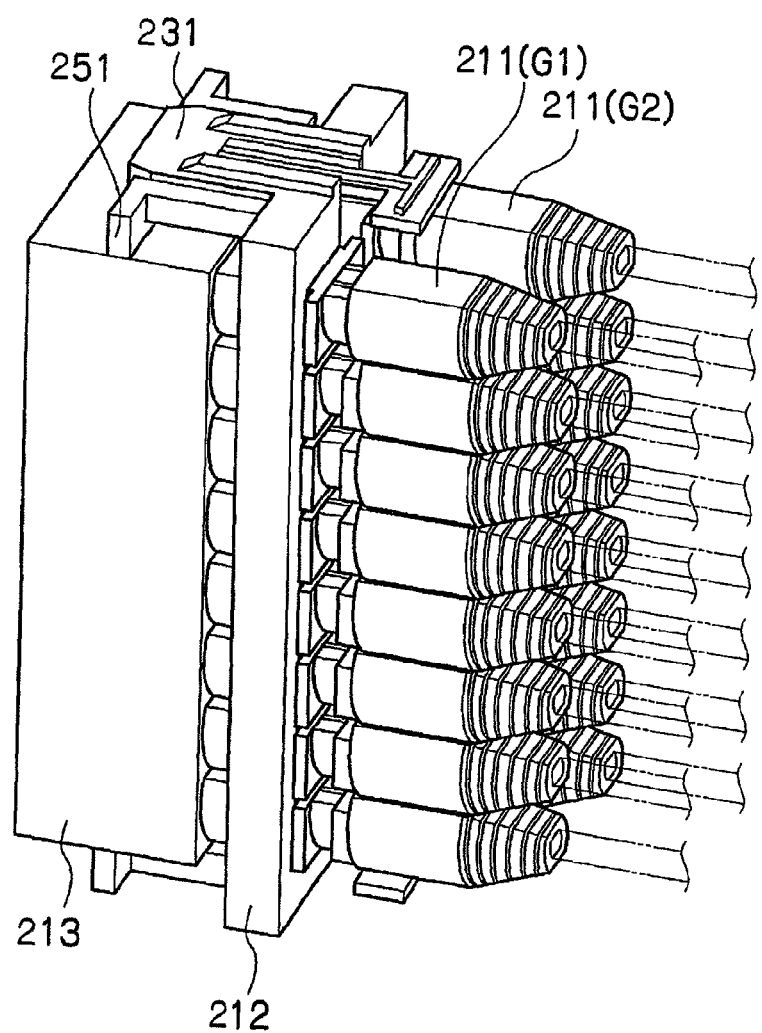
FIG. 25 is a perspective view showing a state where the positioning member and the adapter are connected.
Figure 26:
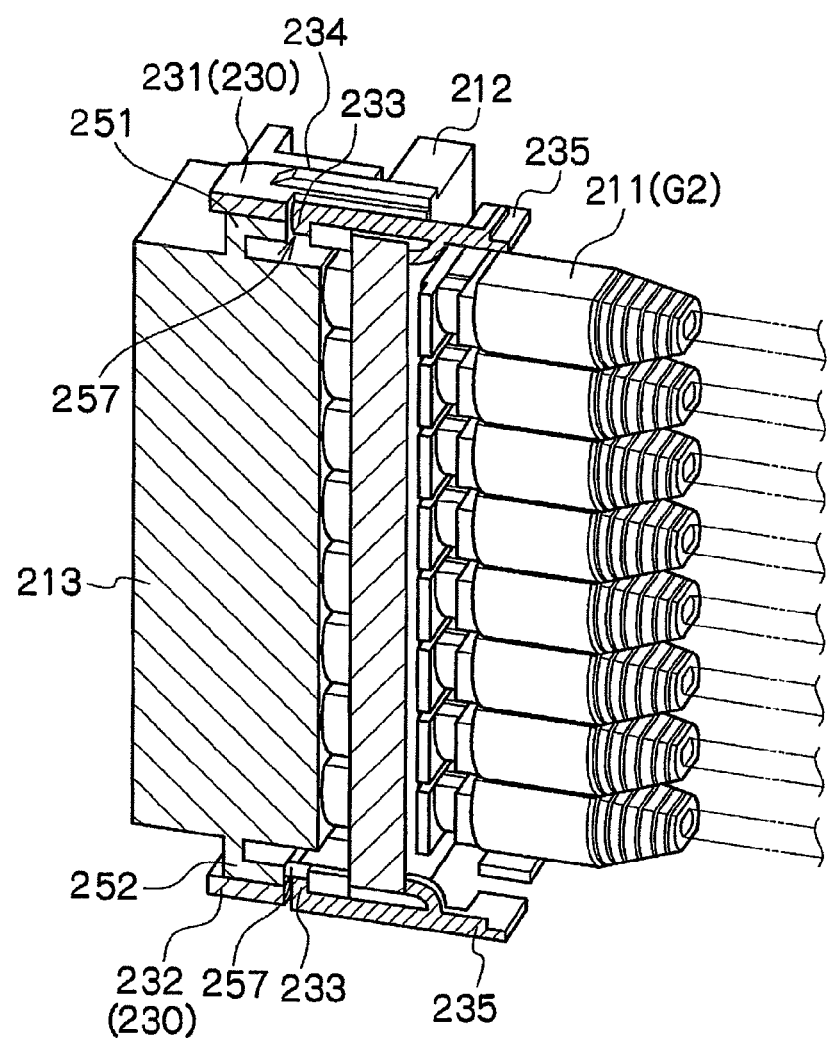
FIG. 26 is a cross-sectional view showing a state where the positioning member and the adapter are connected.

FIG. 15 shows a state before the adapter 213 and the positioning member 212 are connected to each other, FIG. 24 shows an initial state where work for connecting the adapter 213 and the positioning member 212 starts, and FIG. 25 shows a state where work for connecting the adapter 213 and the positioning member 212 ends. FIG. 26 shows sections of the adapter 213 and the positioning member 212 in FIG. 25.

As shown in FIG. 24, if the adapter 213 and the positioning member 212 start to be connected, the first receiving portion 251 of the adapter 213 fits the first protrusion 231 of the positioning member 212 along the connection direction R and aligns the first protrusion, and the second receiving portion 252 of the adapter 213 fits the second protrusion 232 of the positioning member 212 along the connection direction R and aligns the second protrusion.

The first protrusion 231 is guided to the first receiving portion 251 along the connection direction R, such that the first protrusion 231 is guided between the two guide portions 256 of the first receiving portion 251, and the second protrusion 232 is guided to the second receiving portion 252 along the connection direction R, such that the second protrusion 232 is guided between the two guide portions 256 of the second receiving portion 252. In this way, the positioning member 212 and the adapter 213 are accurately aligned with respect to the Y and Z directions shown in FIG. 15. Thereby, the optical fiber plugs 211 that are aligned in the positioning member 212 are accurately aligned with the corresponding plug guide holes 260.

If the positioning member 212 advances in the R direction, as shown in FIG. 26, the latch portion 233 of the first protrusion 231 is stuck into the latch hole 257 of the first receiving portion 251, and the latch portion 233 of the second protrusion 232 is stuck into the latch hole 257 of the second receiving portion 252.

Thereby, as shown in FIG. 25, the positioning member 212 is guided and connected with respect to the adapter 213 using the vertically disposed guide fixing portions 230, and can be removably fixed. At this time, a state of the optical fiber plug 211 becomes a state where the tip end is inserted into the plug guide hole 260.

In this way, as shown in FIG. 25, the 16 optical fiber plugs 211 are aligned at the predetermined pitch by the positioning member 212, and the tip end of the plug frame 215 of the optical fiber plug 211 is inserted into the plug guide hole 260 of the adapter 213. If the plug frame 215 of each optical fiber plug 211 is pressed in the R direction, each optical fiber plug 211 is connected to the adapter 213.

FIG. 22 is a cross-sectional view showing a state where the optical fiber plug 211 is positioned by the positioning member 212 and the adapter 213 and connected. Although not shown in FIG. 22, the positioning member 212 is fixed to the adapter 213 by the latch portion 233. At this time, a gap exists between the connection releasing portion 280 and the slider 224.

Although not shown in FIG. 22, the optical fiber plug 211 is connected from the plug guide hole 260 of the reverse side of the adapter 213 in the same ways as the above way, and the optical fiber plugs 211 are connected by contacting the tip ends of the ferrules 216. The optical fiber plug 211 that is connected from the reverse side may be aligned using another positioning member 212, or may be individually connected without using the positioning member 212.

Since the optical fiber plugs 211 that face each other store springs in the plug frames 215, the optical fibers F are surely connected by pressing the ferrules 216 to each other. As a reaction, each optical fiber plug 211 receives the force of a direction extruded from the adapter 213. However, the engagement protrusion 226 of the plug frame 215 is engaged with the arm 270 of the adapter 213 and the tip end of the slider 224 is put on from the outside of the arm 270, and the arm 270 is suppressed from being opened. Therefore, a connected state can be maintained.

Next, a sequence of releasing connection of the optical fiber plugs 211 from the adapter 213 will be described using FIGS. 23 and 27 to 29.

Figure 27:
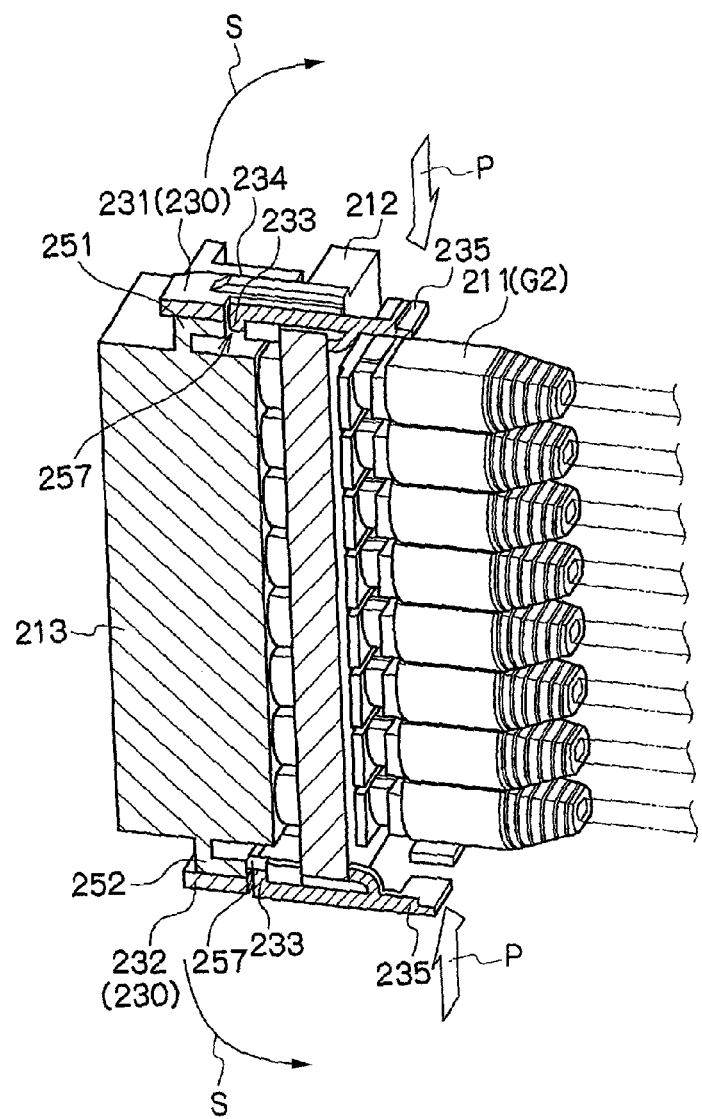
FIG. 27 is a perspective view showing an aspect where a connected state of the positioning member and the adapter is released.

First, as shown in FIG. 27, if the worker presses the vertically disposed two operation arms 235 in a P direction using the finger, the flat first protrusion 231 and the flat second protrusion 232 can be lifted in an S direction. Thereby, the latch portion 233 of the first protrusion 231 is separated from the latch hole 257 of the first receiving portion 251 shown in FIG. 26 and the latch portion 233 of the second protrusion 232 is separated from the latch hole 257 of the second receiving portion 252. Therefore, connection of the positioning member 212 and the adapter 213 can be released and fixation can be released.

When the plug frames 215 of the 16 optical fiber plugs 211 are pulled out from the plug guide holes 216 of the adapter 213, the worker may hold the positioning member 212 and pull the positioning member 212 along in the opposite direction R1.

FIG. 23 is a cross-sectional view showing a state where the positioning member 212 is pulled in the R1 direction and the first positioning surface portion 281 of the positioning member 212 contacts the slider 224 of the optical fiber plug 211 of the first optical fiber plug group G1.

As apparent from FIG. 23, at this time, the second positioning surface portion 282 of the positioning member 212 does not contact the slider 224 of the optical fiber plug 211 of the second optical fiber plug group G2, and a gap that corresponds to the distance L is maintained.

Figure 28:
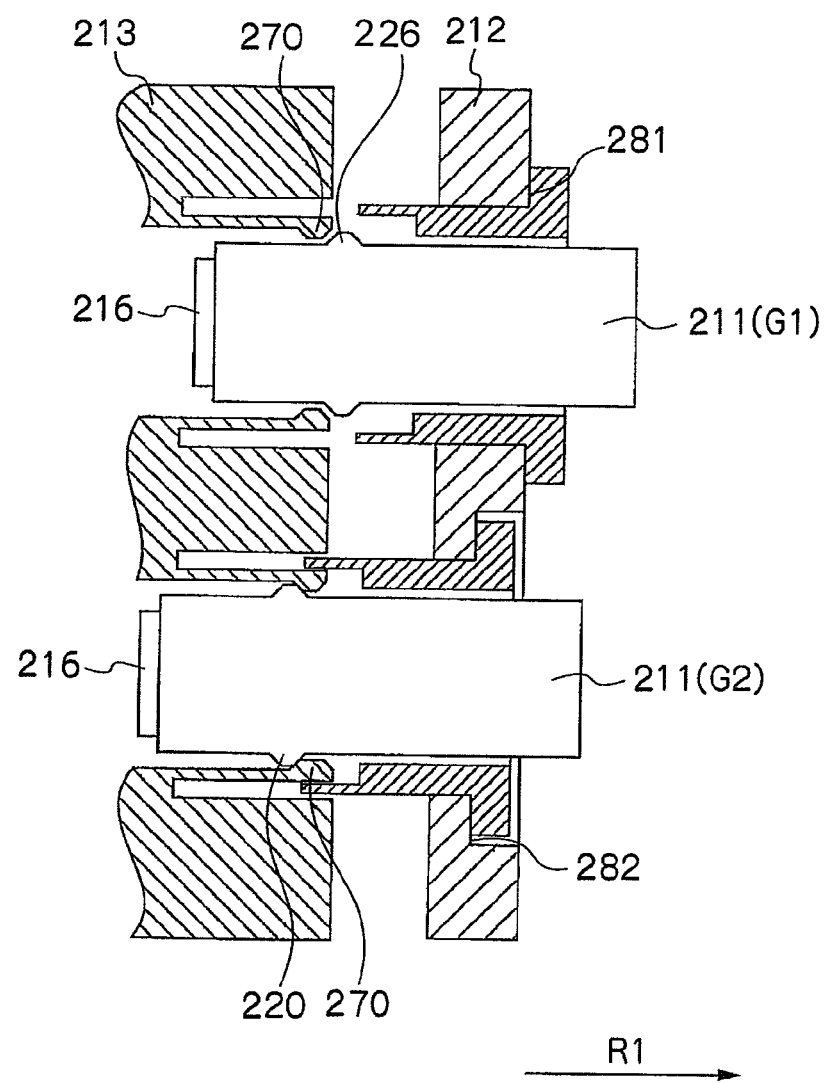
FIG. 28 is a diagram showing a state where engagement protrusions of the optical fiber plugs of the first optical fiber plug group G1 are first separated from the adapter.

Accordingly, if the worker holds the positioning member 212 and pulls the positioning member 212 along the opposite direction R1, first, only the optical fiber plugs 211 of the first optical fiber plug group G1 is pulled in the R1 direction. Accordingly, as shown in FIG. 28, firstly the slider 224 of the optical fiber plug 211 only of the first optical fiber plug group G1 is pulled out from the arm 270 of the adapter 213, then the engagement protrusions 226 are separated from the pair of arms 270, so only connection of the optical fiber plug 211 of the first optical fiber plug group G1 from the adapter 213 is released. Then, the second positioning surface portion 282 of the positioning member 212 contacts the slider 224 of the optical fiber plug 211 of the second optical fiber plug group G2.

Figure 29:
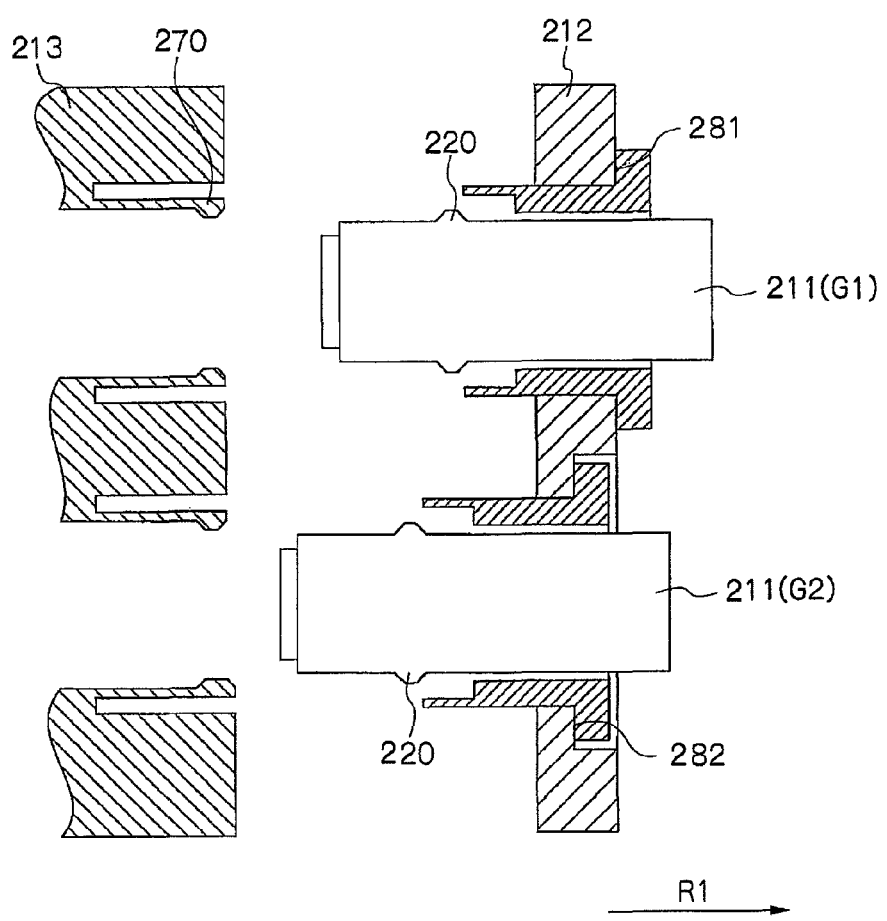
FIG. 29 is a diagram showing a state where engagement protrusions of the optical fiber plugs of the second optical fiber plug group G2 are separated from the adapter, after the engagement protrusions of the optical fiber plugs of the first optical fiber plug group G1 are separated from the adapter.

If the worker holds the positioning member 212 and pulls the positioning member 212 along the opposite direction R1 and the positioning member 212 is moved along the opposite direction R1, the optical fiber plug 211 of the second optical fiber plug group G2 is pulled in the R1 direction. For this reason, as shown in FIG. 29, the engagement protrusions 226 of the optical fiber plug 211 of the second optical fiber plug group G2 are separated from the pair of arms 270 and connection is released.

As such, if the worker holds the positioning member 212 and pulls the positioning member 212 along the opposite direction R1, connection of the 8 optical fiber plugs 211 of the first optical fiber plug group G1 can be first released, and connection of the 8 optical fiber plugs 211 of the second optical fiber plug group G2 can be then released.

From this, if the worker holds the positioning member 212 and pulls the positioning member 212 along the opposite direction R1, only the 8 optical fiber plugs 211 of the first optical fiber plug group G1 can be pulled out from the plug guide holes 260 of the adapter 213 by the flat first positioning surface portion 281. And then, by the recessed second positioning surface portion 282 formed at the side of the back surface of the positioning member 212, the 8 optical fiber plugs 211 of the second optical fiber plug group G2 can be pulled out from the plug guide holes 260 of the adapter 213. That is, the 8 optical fiber plugs 211 of the first optical fiber plug group G1 and the 8 optical fiber plugs 211 of the second optical fiber plug group G2 can be sequentially pulled out with a time lag, not simultaneously.

Accordingly, the pulling force of the plural optical fiber plugs 211 that is generated when the worker holds the positioning member 212 and pulls the positioning member 212 along the opposite direction R1 can be dispersed, and the force that is needed to release the connected state of the plural optical fiber plugs 211 can be reduced.

In the example shown in the drawings, since the connection releasing portion 280 is constructed by the flat first positioning surface portion 281 and the recessed second positioning surface portion 282, the plural optical fiber plugs 211 can be pulled out from the plug guide hole 260 of the adapter 213 with the half of the force that would be required when all fiber plugs 211 are pulled out at once.

Even though the number of optical fiber plugs 211 is large, the pulling force can be dispersed.

The connector unit of the present invention is a connector unit for positioning and connecting the plural optical fiber plugs. The connector unit of the present invention includes the positioning member that has the plural plug insertion holes to arrange and position the plural optical fiber plugs, the plural plug guide holes that guide the tip ends of the plural optical fiber plugs positioned by the positioning member along the insertion and connection direction of the optical fiber plugs and connect the tip ends, and the adapter that has the arms formed in the plug guide holes and removably engage the engagement protrusions of the optical fiber plugs.

The connection releasing portion that divides the plural optical fiber plugs into the plural optical fiber plug groups and changes the timing of releasing the connection of the engagement protrusions of the optical fiber plugs from the arms of the adapter for each of the plural optical fiber plug groups is provided in the plural plug insertion holes of the positioning member. Thereby, even though the number of optical fiber connectors increases, the pulling force can be dispersed and the connected state of the optical fiber connectors can be easily released.

The plural optical fiber plug groups have the first optical fiber plug group and the second optical fiber plug group. The connection releasing portion has the first positioning surface portion that contacts the slider of each optical fiber plug of the first optical fiber plug group and is interlocked with the positioning member and retreats the optical fiber plugs of the first optical fiber plug group, and the second positioning surface portion that is formed at the position recessed more than the first positioning surface portion and delays contact of the slider of each optical fiber plug of the second optical fiber plug group with the positioning member. Thereby, since the plural optical fiber plugs can be pulled out in order of two stages, the pulling force can be dispersed to become half the original pulling force, and the connected state of the optical fiber connectors can be easily released.

The optical fiber plug has the plug frame that holds the optical fiber ferrule and the slider that is disposed slidably with respect to the plug frame. The slider has the latch portion. In the plug insertion holes of the positioning member, the grooves are formed such that the latch portion of the slide is slidable along the connection direction and the optical fiber plug is not pulled out from the plug insertion hole in the direction opposite to the direction where the optical fiber plug is inserted into the plug insertion hole. Thereby, the optical fiber plug can be slidably held in the plug insertion hole.

The slider has the feather-shaped protrusions that prevent the slider from passing through the positioning member along the connection direction. Thereby, the optical fiber plug can be prevented from falling from the positioning member toward the front of the connection direction, and the optical fiber plug can be slidably fixed to the positioning member.

The connector unit has the guide fixing portion that guides the positioning member to the adapter and removably fixes the positioning member. Thereby, the positioning member can be surely fixed to the adapter and the positioning member can be easily separated from the adapter.

The guide fixing portion has the first protrusion that is formed in one end of the positioning member, the second protrusion that is formed in the other end of the positioning member, the first receiving portion that is formed in the adapter, fits the first protrusion of the positioning member along the connection direction, and removably fixes the first protrusion, and the second receiving portion that is formed in the adapter, fits the second protrusion of the positioning member along the connection direction, and removably fixes the second protrusion. Thereby, the positioning member and the adapter can be surely connected by the protrusions and the receiving portions.

Meanwhile, the present invention is not limited to the above embodiments and various modifications can be adopted.

For example, in the example shown in the drawings, the connection releasing portion 280 is constructed by the total of positioning surface portions of two kinds that include the flat first positioning surface portion 281 and the recessed second positioning surface portion 282. However, the present invention is not limited thereto, and the optical fiber plugs may be divided into three or more optical fiber groups and the connection releasing portion may be constructed by three kinds of positioning surface portions. Thereby, the pulling force can be more dispersed.

Further, arrangement of the optical fiber plugs of the first optical fiber plug group and the optical fiber plugs of the second optical fiber plug groups is not limited to the example shown in FIG. 15, and the optical fiber plugs may be arbitrarily arranged.

Meanwhile, the present invention is not limited to the above embodiments and various modifications can be adopted.

For example, the number of optical fiber plugs is not limited to the example shown in the drawings, and may be arbitrarily set. The guide portions or the guide fixing portions may not be symmetrical to each other in the vertical direction. The guide portions or the guide fixing portions may have different shapes or sizes, and the positioning member and the adapter may be guided to only one side of the vertical direction. This configuration is preferable because the configuration enables connection in only an appropriate direction, when the optical fiber plug has the directional property or the ferrule is angle-polished.

The invention claimed is:

1. A connector unit for positioning and connecting a plurality of optical fiber plugs, the connector unit comprising:
a positioning member that has a plurality of plug insertion holes for arranging and positioning the plurality of optical fiber plugs; and
an adapter that has a plurality of plug guide holes for guiding tip ends of the plurality of optical fiber plugs positioned by the positioning member along an inserted and connected direction of the optical fiber plugs to connect with the optical fiber plugs, and arms which are formed in the plug guide holes and removably engage the optical fiber plugs,
wherein the plurality of plug insertion holes is provided with a connection releasing portion for dividing the plurality of optical fiber plugs into a plurality of optical fiber groups and for changing a timing of releasing connections of the optical fiber plugs from the adapter for each of the plurality of optical fiber plug groups.

2. The connector unit of claim 1, further comprising:
a guide portion for guiding the positioning member with respect to the adapter and aligning the tip ends of the plurality of optical fiber plugs in the plug guide holes of the adapter respectively.

3. The connector unit of claim 2,
wherein the guide portion has a plurality of guide pins that are provided in the positioning member and guide holes that are provided in the adapter to insert the guide pins therein.

4. The connector unit of claim 2,
wherein the guide portion has a first protrusion that is formed in one end of the positioning member, a second protrusion that is formed in the other end of the positioning member, a first receiving portion that is formed in the adapter to fit the first protrusion of the positioning member along the connection direction and position the first protrusion, and a second receiving portion that is formed in the adapter to fit the second protrusion of the positioning member along the connection direction and position the second protrusion.

5. The connector unit of claim 2,
wherein the guide portion has a guide fixing portion for removably fixing the positioning member to the adapter.

6. The connector unit of claim 2,
wherein the positioning member is positioned with respect to the adapter by the guide portion, before the tip ends of the optical fiber plugs start to be inserted into the plug guide holes of the adapter.

7. The connector unit of claim 1,
wherein each of the optical fiber plugs has a plug frame that holds an optical fiber ferrule and a slider that is disposed slidably with respect to the plug frame,
the slider has a latch portion, and
grooves are formed in the plug insertion holes, such that the latch portion is slidable along the connection direction and the optical fiber plugs are not pulled out from the plug insertion holes in a direction opposite to a direction where the optical fiber plugs are inserted into the plug insertion holes.

8. The connector unit of claim 7,
wherein the slider is provided with feather-shaped protrusions to prevent the slider from being pulled out from the side of the connection direction of the positioning member.

9. The connector unit of claim 1,
wherein the plurality of optical fiber plug groups have at least a first optical fiber plug group and a second optical fiber plug group,
the connection releasing portion has positioning surface portions that are engaged with feather-shaped protrusions to move the optical fiber plugs in a direction opposite to the inserted and connected direction through the sliders, and
the positioning surface portions have at least a first positioning surface portion that determines the engagement position of the first optical fiber plug group and a second positioning surface portion that determines the engagement position of the second optical fiber plug group, and the first positioning surface portion and the second positioning surface portion are formed at the predetermined distance in the connection direction.

* * * * *